US012100016B2

United States Patent
VanLandeghem et al.

(10) Patent No.: US 12,100,016 B2
(45) Date of Patent: *Sep. 24, 2024

(54) METHODS AND APPARATUS TO GENERATE AUDIENCE METRICS USING THIRD-PARTY PRIVACY-PROTECTED CLOUD ENVIRONMENTS

(71) Applicant: The Nielsen Company (US), LLC, New York, NY (US)

(72) Inventors: Matthew VanLandeghem, Schaumburg, IL (US); Lianghua Shao, Duarte, CA (US); Jessica Brinson, Chicago, IL (US); Sagar Sanghavi, Sunnyvale, CA (US); Jonathan Sullivan, Hurricane, UT (US); Billie J. Kline, Inverness, FL (US); Mala Sivarajan, San Ramon, CA (US); Shruthi Koundinya Nagaraja, San Jose, CA (US); Logan Thomas, Sunnyvale, CA (US); Arushi Kumar, Hyattsville, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,961

(22) Filed: Nov. 10, 2022

(65) Prior Publication Data

US 2023/0083206 A1 Mar. 16, 2023

Related U.S. Application Data

(63) Continuation of application No. PCT/US2021/032055, filed on May 12, 2021, and a
(Continued)

(51) Int. Cl.
*G06Q 30/02* (2023.01)
*G06F 16/215* (2019.01)
(Continued)

(52) U.S. Cl.
CPC ....... *G06Q 30/0201* (2013.01); *G06F 16/215* (2019.01); *G06F 16/2365* (2019.01);
(Continued)

(58) Field of Classification Search
None
See application file for complete search history.

(56) References Cited

U.S. PATENT DOCUMENTS 6,020,755 A 2/2000 Andrews et al.
6,542,734 B1 4/2003 Abrol et al.
(Continued)

FOREIGN PATENT DOCUMENTS

KR 100910517 7/2009
WO 2015102795 7/2015
(Continued)

OTHER PUBLICATIONS

International Searching Authority, "International Search Report," dated Aug. 31, 2021 in connection with International Patent Application No. PCT/US2021/032055, 4 pages.
(Continued)

*Primary Examiner* — Vincent M Cao

(57) ABSTRACT

An example system disclosed herein includes programmable circuitry to identify donor adjustment factors and recipient adjustment factors used for correction of media impressions logged by a database proprietor, the donor adjustment factors including first donor adjustment factors associated with a first geographic region and second donor adjustment factors associated with a second geographic region, determine a first reduced donor factor set corresponding to ones
(Continued)

of the first donor adjustment factors that satisfy a threshold, determine a second reduced donor factor set corresponding to ones of the second donor adjustment factors that satisfy the threshold, and generate imputation factors based on an aggregation of retained ones of the donor adjustment factors, the retained ones of the donor adjustment factors selected based on the first reduced donor factor set and the second reduced donor factor set, the imputation factors to reduce error in the correction.

20 Claims, 8 Drawing Sheets

Related U.S. Application Data continuation of application No. 17/318,420, filed on May 12, 2021, now Pat. No. 11,783,353.

(60) Provisional application No. 63/024,260, filed on May 13, 2020.

(51) Int. Cl.

| G06F 16/23 | (2019.01) |
|---|---|
| G06F 16/2457 | (2019.01) |
| G06F 16/28 | (2019.01) |
| G06F 16/9536 | (2019.01) |
| G06F 21/62 | (2013.01) |
| G06N 5/04 | (2023.01) |
| G06N 20/00 | (2019.01) |
| G06Q 30/0201 | (2023.01) |
| G06Q 30/0202 | (2023.01) |
| G06Q 30/0204 | (2023.01) |
| G06Q 30/0242 | (2023.01) |
| H04L 67/303 | (2022.01) |
| H04L 67/306 | (2022.01) |
| H04L 67/50 | (2022.01) |
| H04L 67/53 | (2022.01) |

(52) U.S. Cl.
CPC ...... *G06F 16/24578* (2019.01); *G06F 16/285* (2019.01); *G06F 16/9536* (2019.01); *G06F 21/6263* (2013.01); *G06N 5/04* (2013.01); *G06N 20/00* (2019.01); *G06Q 30/0202* (2013.01); *G06Q 30/0204* (2013.01); *G06Q 30/0205* (2013.01); *G06Q 30/0245* (2013.01); *G06Q 30/0246* (2013.01); *H04L 67/303* (2013.01); *H04L 67/306* (2013.01); *H04L 67/53* (2022.05); *H04L 67/535* (2022.05)

(56) References Cited

U.S. PATENT DOCUMENTS

| 8,271,886 | B2 | 9/2012 | Lee et al. |
|---|---|---|---|
| 8,543,423 | B2 | 9/2013 | O'Malley et al. |
| 8,543,523 | B1 | 9/2013 | Palit et al. |
| 8,910,195 | B1 | 12/2014 | Barney et al. |
| 9,430,746 | B2* | 8/2016 | Pecjak ............ H04L 67/02 |
| 9,712,869 | B1 | 7/2017 | Arini |
| 9,953,330 | B2 | 4/2018 | Rao et al. |
| 10,045,082 | B2 | 8/2018 | Nagaraja Rao et al. |
| 10,450,082 | B1 | 10/2019 | Blanton et al. |
| 10,469,903 | B2 | 11/2019 | Singh et al. |
| 2003/0149900 | A1 | 8/2003 | Glassman et al. |
| 2008/0208649 | A1 | 8/2008 | Ficery et al. |
| 2008/0300965 | A1* | 12/2008 | Doe ............ G06Q 30/0204 705/7.33 |
| 2010/0146531 | A1 | 6/2010 | Fu et al. |
| 2010/0146534 | A1 | 6/2010 | Chen et al. |
| 2010/0161385 | A1 | 6/2010 | Karypis et al. |
| 2011/0131166 | A1 | 6/2011 | Li et al. |
| 2012/0151079 | A1 | 6/2012 | Besehanic et al. |
| 2012/0272259 | A1 | 10/2012 | Cortes et al. |
| 2013/0045022 | A1 | 2/2013 | Zhang et al. |
| 2013/0145002 | A1 | 6/2013 | Kannan et al. |
| 2013/0145022 | A1 | 6/2013 | Srivastava et al. |
| 2014/0108130 | A1 | 4/2014 | Vos et al. |
| 2014/0259040 | A1 | 9/2014 | Han et al. |
| 2014/0298025 | A1 | 10/2014 | Burbank et al. |
| 2014/0337275 | A1 | 11/2014 | McCann et al. |
| 2014/0358676 | A1 | 12/2014 | Srivastava et al. |
| 2015/0081604 | A1 | 3/2015 | Duque et al. |
| 2015/0180989 | A1 | 6/2015 | Seth |
| 2015/0186403 | A1 | 7/2015 | Srivastava et al. |
| 2015/0193813 | A1* | 7/2015 | Toupet ............ G06Q 50/01 705/14.41 |
| 2015/0193816 | A1 | 7/2015 | Toupet et al. |
| 2015/0262201 | A1 | 9/2015 | Rao et al. |
| 2015/0262207 | A1 | 9/2015 | Rao et al. |
| 2015/0287100 | A1 | 10/2015 | Jain et al. |
| 2015/0324837 | A1 | 11/2015 | Shimizu et al. |
| 2016/0019580 | A1 | 1/2016 | Rao et al. |
| 2016/0191970 | A1 | 6/2016 | Sheppard et al. |
| 2016/0277794 | A1 | 9/2016 | Meraviglia |
| 2016/0342699 | A1 | 11/2016 | Shen et al. |
| 2016/0369235 | A1 | 12/2016 | Woods et al. |
| 2016/0372820 | A1 | 12/2016 | Collignon |
| 2016/0373820 | A1 | 12/2016 | Meyer et al. |
| 2016/0379231 | A1 | 12/2016 | Sheppard et al. |
| 2016/0379235 | A1* | 12/2016 | Mendrisova ....... G06Q 30/0204 705/7.33 |
| 2017/0004526 | A1 | 1/2017 | Morovati et al. |
| 2017/0004537 | A1 | 1/2017 | Otto et al. |
| 2017/0011420 | A1 | 1/2017 | Sullivan et al. |
| 2017/0017975 | A1 | 1/2017 | Sheppard et al. |
| 2017/0076299 | A1 | 3/2017 | Modarresi |
| 2017/0091794 | A1* | 3/2017 | Sheppard ........... G06Q 30/0204 |
| 2017/0132528 | A1 | 5/2017 | Aslan et al. |
| 2017/0162528 | A1 | 6/2017 | Umemoto |
| 2017/0272816 | A1 | 9/2017 | Olds |
| 2017/0282916 | A1 | 10/2017 | Remillard et al. |
| 2018/0053097 | A1 | 2/2018 | Soni et al. |
| 2018/0189660 | A1 | 7/2018 | Malmi et al. |
| 2018/0198543 | A1 | 7/2018 | Perrin et al. |
| 2018/0204230 | A1 | 7/2018 | Cai et al. |
| 2018/0218168 | A1 | 8/2018 | Goel et al. |
| 2018/0227631 | A1 | 8/2018 | Singh et al. |
| 2018/0242050 | A1 | 8/2018 | Denslow et al. |
| 2018/0286000 | A1 | 10/2018 | Berry et al. |
| 2019/0034962 | A1 | 1/2019 | Toupet et al. |
| 2019/0042887 | A1 | 2/2019 | Nguyen et al. |
| 2019/0147466 | A1* | 5/2019 | Rao ............ G06Q 30/0241 705/7.32 |
| 2019/0289363 | A1 | 9/2019 | Nagaraja Rao et al. |
| 2020/0090073 | A1 | 3/2020 | Zhan et al. |
| 2020/0177955 | A1 | 6/2020 | Singh et al. |
| 2021/0231299 | A1 | 7/2021 | Nguyen |
| 2021/0231419 | A1 | 7/2021 | Do et al. |
| 2021/0231460 | A1 | 7/2021 | Uno |
| 2021/0231466 | A1 | 7/2021 | Rosenberger |
| 2021/0231622 | A1 | 7/2021 | Watanabe |
| 2021/0231628 | A1 | 7/2021 | Nenoff et al. |
| 2021/0306688 | A1 | 9/2021 | Bress et al. |
| 2021/0357374 | A1 | 11/2021 | VanLandeghem et al. |
| 2021/0357788 | A1 | 11/2021 | VanLandeghem et al. |
| 2021/0357956 | A1 | 11/2021 | Shao et al. |
| 2021/0357957 | A1 | 11/2021 | VanLandeghem et al. |
| 2021/0357958 | A1 | 11/2021 | Shao et al. |
| 2021/0357972 | A1 | 11/2021 | VanLandeghem et al. |
| 2021/0357973 | A1 | 11/2021 | VanLandeghem et al. |
| 2021/0375972 | A1 | 12/2021 | Or-Bach et al. |
| 2023/0071645 | A1 | 3/2023 | VanLandeghem et al. |
| 2023/0072357 | A1 | 3/2023 | VanLandeghem et al. |
| 2023/0075196 | A1 | 3/2023 | VanLandeghem et al. |
| 2023/0077544 | A1 | 3/2023 | Shao et al. |
| 2023/0083206 | A1 | 3/2023 | VanLandeghem et al. |

(56) References Cited

U.S. PATENT DOCUMENTS

| | | |
|---|---|---|
| 2023/0096072 A1 | 3/2023 | VanLandeghem et al. |
| 2023/0114627 A1 | 4/2023 | Gombert et al. |

FOREIGN PATENT DOCUMENTS

| | | |
|---|---|---|
| WO | 2018046100 | 3/2018 |
| WO | 2021231299 | 11/2021 |
| WO | 2021231419 | 11/2021 |
| WO | 2021231446 | 11/2021 |
| WO | 2021231460 | 11/2021 |
| WO | 2021231622 | 11/2021 |
| WO | 2021231624 | 11/2021 |
| WO | 2021231628 | 11/2021 |
| WO | 2021234299 A1 | 11/2021 |

OTHER PUBLICATIONS

International Searching Authority, "Written Opinion," dated Aug. 31, 2021 in connection with International Patent Application No. PCT/US2021/032055, 3 pages.

United States Patent and Trademark Office, "Non-Final Office Action," dated Sep. 14, 2021 in connection with U.S. Appl. No. 17/317,404, 24 pages.

Koehler et al., "A Method for Measureing Online Audiences," Google Inc., 2013. Retrieved from <https://research.google/pubs/pub41089/>, 24 pages.

Moore et al. "Facebook's Fake Numbers Problem," Lex in Depth, Financial Times, Nov. 17, 2019, 6 pages.

International Searching Authority "International Search Report," dated Aug. 31, 2021 in connection with International Patent Application No. PCT/US2021/031822, 3 pages.

International Searching Authority "Written Opinion," dated Aug. 31, 2021 in connection with International Patent Application No. PCT/US2021/031822, 4 pages.

International Searching Authority "International Search Report," dated Aug. 30, 2021 in connection with International Patent Application No. PCT/US2021/032058, 4 pages.

International Searching Authority "Written Opinion," dated Aug. 30, 2021 in connection with International Patent Application No. PCT/US2021/032058, 4 pages.

International Searching Authority "International Search Report," dated Aug. 30, 2021 in connection with International Patent Application No. PCT/US2021/031805, 3 pages.

International Searching Authority "Written Opinion," dated Aug. 30, 2021 in connection with International Patent Application No. PCT/US2021/031805, 4 pages.

International Searching Authority "International Search Report," dated Aug. 30, 2021 in connection with International Patent Application No. PCT/US2021/032062, 3 pages.

International Searching Authority "Written Opinion," dated Aug. 30, 2021 in connection with International Patent Application No. PCT/US2021/032062, 4 pages.

International Searching Authority "International Search Report," dated Sep. 1, 2021 in connection with International Patent Application No. PCT/US2021/031770, 3 pages.

International Searching Authority "Written Opinion," dated Sep. 1, 2021 in connection with International Patent Application No. PCT/US2021/031770, 3 pages.

International Searching Authority "International Search Report," dated Aug. 31, 2021 in connection with International Patent Application No. PCT/US2021/031583, 3 pages.

International Searching Authority "Written Opinion," dated Aug. 31, 2021 in connection with International Patent Application No. PCT/US2021/031583, 4 pages.

United States Patent and Trademark Office, "Non-Final Office Action," dated Sep. 16, 2021 in connection with U.S. Appl. No. 17/317,461, 18 pages.

United States Patent and Trademark Office, "Final Office Action," dated Jan. 3, 2022 in connection with U.S. Appl. No. 17/317,461, 20 pages.

Google Developers, "Privacy Checks in Ads Data Hub," updated on Apr. 23, 2020, 5 pages, retrieved from <https://developers.google.com/ads-data-hub/guides/privacy-checks> on Apr. 29, 2020.

Google Developers, "Privacy Checks in Ads Data Hub," 2 pages, retrieved from <https://developers.google.com/ads-data-hub> on Apr. 30, 2020.

Google Cloud, "The Create Model statement," updated Apr. 20, 2020, 34 pages, retrieved from <https://cloud.google.com/bigquery-ml/docs/reference/standard-sql/bigqueryml-syntax-create> on May 11, 2020.

United States Patent and Trademark Office, "Non-Final Office Action," dated Aug. 4, 2022 in connection with U.S. Appl. No. 17/318,517, 27 pages.

Braverman, "Are The Online Marketing Efforts of TV Shows and Programs Worthwhile?," 24/7 Wall St., Mar. 30, 2011, 9 pages.

United States Patent and Trademark Office, "Final Office Action," dated Feb. 25, 2022 in connection with U.S. Appl. No. 17/317,404, 20 pages.

United States Patent and Trademark Office, "Non-Final Office Action," dated Jul. 21, 2022 in connection with U.S. Appl. No. 17/317,404, 19 pages.

United States Patent and Trademark Office, "Non-Final Office Action," dated Apr. 20, 2022 in connection with U.S. Appl. No. 17/317,461, 20 pages.

United States Patent and Trademark Office, "Final Office Action," dated Aug. 1, 2022 in connection with U.S. Appl. No. 17/317,461, 15 pages.

United States Patent and Trademark Office, "Advisory Action," dated Oct. 20, 2022 in connection with U.S. Appl. No. 17/317,461, 4 pages.

United States Patent and Trademark Office, "Final Office Action," dated Dec. 15, 2022 in connection with U.S. Appl. No. 17/317,404, 24 pages.

Samek, "Introducing Ads Data Hub: Next generation insights and reporting," Google Cloud, May 24, 2017, 2 pages.

Weissbrot, "Google's Ads Data Hub Works for Agencies—But It's Both A Blessing And A Curse," Adexchanger, Jun. 20, 2019, 3 pages.

United States Patent and Trademark Office, "Non-Final Office Action," dated Jan. 17, 2023 in connection with U.S. Appl. No. 17/317,461, 20 pages.

United States Patent and Trademark Office, "Final Office Action," dated Feb. 9, 2023 in connection with U.S. Appl. No. 17/318,517, 21 pages.

United States Patent and Trademark Office, "Non-Final Office Action," issued in connection with U.S. Appl. No. 17/318,766, dated Mar. 8, 2023, 14 pages.

United States Patent and Trademark Office, "Non-Final Office Action," issued in connection with U.S. Appl. No. 17/984,982, dated Mar. 8, 2023, 10 pages.

United States Patent and Trademark Office, "Non-Final Office Action," issued in connection with U.S. Appl. No. 17/984,979, dated Mar. 31, 2023, 36 pages.

United States Patent and Trademark Office, "Non-Final office Action," dated May 11, 2023 in connection with U.S. Appl. No. 17/317,616, 18 pages.

International Searching Authority, "International Preliminary Report on Patentability," dated Nov. 24, 2022 in connection with International Patent Application No. PCT/US2021/032058, 6 pages.

United States Patent and Trademark Office, "Non-Final Office Action," dated Jan. 5, 2023 in connection with U.S. Appl. No. 17/318,420, 12 pages.

United States Patent and Trademark Office, "Notice of Allowance," dated May 31, 2023 in connection with U.S. Appl. No. 17/318,420, 9 pages.

United States Patent and Trademark Office, "Final Office Action," issued in connection with U.S. Appl. No. 17/984,979, dated Nov. 8, 2023, 45 pages.

(56) References Cited

OTHER PUBLICATIONS

United States Patent and Trademark Office, "Non-Final Office Action," issued in connection with U.S. Appl. No. 17/985,001, dated Aug. 31, 2023, 17 pages.

United States Patent and Trademark Office, "Final Office Action," issued in connection with U.S. Appl. No. 17/985,001, dated Jan. 3, 2024, 12 pages.

United States Patent and Trademark Office, "Non-Final Office Action," issued in connection with U.S. Appl. No. 17/984,978, dated Jun. 23, 2023, 18 pages.

United States Patent and Trademark Office, "Final Office Action," issued in connection with U.S. Appl. No. 17/984,978, dated Dec. 20, 2023, 12 pages.

Sem, "Introduction to Ads Data Hub," cited in connection with U.S. Appl. No. 17/984,978, on Dec. 20, 2023, which stated retrieved on 2023-12-15 from <https://semtr.com/blog/en/introduction-to-ads-data-hub/>, 5 pages.

Sanchez et al., "ZSim: Fast and Accurate Microarchitectural Simulation of Thousand-Core Systems," ACMSIGARCH Computer Architecture News, Jun. 2013, 12 pages.

\* cited by examiner

METHODS AND APPARATUS TO GENERATE AUDIENCE METRICS USING THIRD-PARTY PRIVACY-PROTECTED CLOUD ENVIRONMENTS

RELATED APPLICATION(S)

This patent arises from a continuation of PCT Patent Application No. PCT/US2021/32055 and U.S. patent application Ser. No. 17/318,420, and claims priority to PCT Patent Application No. PCT/US2021/32055, filed on May 12, 2021, and U.S. patent application Ser. No. 17/318,420, filed May 12, 2021. PCT Patent Application No. PCT/US2021/32055 and U.S. patent application Ser. No. 17/318,420 claim the benefit of U.S. Provisional Patent Application No. 63/024,260, filed on May 13, 2020. PCT Patent Application No. PCT/US2021/32055, U.S. patent application Ser. No. 17/318,420, and U.S. Provisional Patent Application No. 63/024,260 are hereby incorporated herein by reference in their entireties. Priority to PCT Patent Application No. PCT/US2021/32055, U.S. patent application Ser. No. 17/318,420 and U.S. Provisional Patent Application No. 63/024,260 is hereby claimed.

Additionally, U.S. patent application Ser. No. 17/316,168, entitled "METHODS AND APPARATUS TO GENERATE COMPUTER-TRAINED MACHINE LEARNING MODELS TO CORRECT COMPUTER-GENERATED ERRORS IN AUDIENCE DATA," which was filed on May 10, 2021, U.S. patent application Ser. No. 17/317,404, entitled "METHODS AND APPARATUS TO GENERATE AUDIENCE METRICS USING THIRD-PARTY PRIVACY-PROTECTED CLOUD ENVIRONMENTS," which was filed on May 11, 2021, U.S. patent application Ser. No. 17/317,461, entitled "METHODS AND APPARATUS FOR MULTI-ACCOUNT ADJUSTMENT IN THIRD-PARTY PRIVACY-PROTECTED CLOUD ENVIRONMENTS," which was filed on May 11, 2021, U.S. patent application Ser. No. 17/317,616, entitled "METHODS AND APPARATUS TO GENERATE AUDIENCE METRICS USING THIRD-PARTY PRIVACY-PROTECTED CLOUD ENVIRONMENTS," which was filed on May 11, 2021, U.S. patent application Ser. No. 17/318,420, entitled "METHODS AND APPARATUS TO GENERATE AUDIENCE METRICS USING THIRD-PARTY PRIVACY-PROTECTED CLOUD ENVIRONMENTS," which was filed on May 12, 2021, U.S. patent application Ser. No. 17/318,517, entitled "METHODS AND APPARATUS TO GENERATE AUDIENCE METRICS USING THIRD-PARTY PRIVACY-PROTECTED CLOUD ENVIRONMENTS," which was filed on May 12, 2021, and U.S. patent application Ser. No. 17/318,766, entitled "METHODS AND APPARATUS TO ADJUST DEMOGRAPHIC INFORMATION OF USER ACCOUNTS TO REFLECT PRIMARY USERS OF THE USER ACCOUNTS," which was filed on May 12, 2021, are hereby incorporated herein by reference in their entireties.

FIELD OF THE DISCLOSURE

This disclosure relates generally to computer systems for monitoring audiences and, more particularly, to methods and apparatus to generate audience metrics using third-party privacy-protected cloud environments.

BACKGROUND

Media can be presented to and/or accessed by an audience via the Internet. In some cases, audience measurement entity generates panel data based on media accesses by members that are enrolled as panelists in an audience panel created and managed by the audience measurement entity. The audience measurement entity can log impressions corresponding to media accesses by the panelists. The audience measurement entity can generate audience-based media access metrics based on the logged media impressions. In some cases, some audience members are registered users or subscribers of one or more services of a database proprietor, and media accesses can occur while those subscribers are signed into user accounts of the database proprietor. When such media accesses occur, the database proprietor can log impressions data associated with the subscribers. The database proprietor can generate audience-based media access metrics based on the logged media impressions.

BRIEF DESCRIPTION OF THE DRAWINGS

The figures are not to scale. In general, the same reference numbers will be used throughout the drawing(s) and accompanying written description to refer to the same or like parts.

Figure 1:
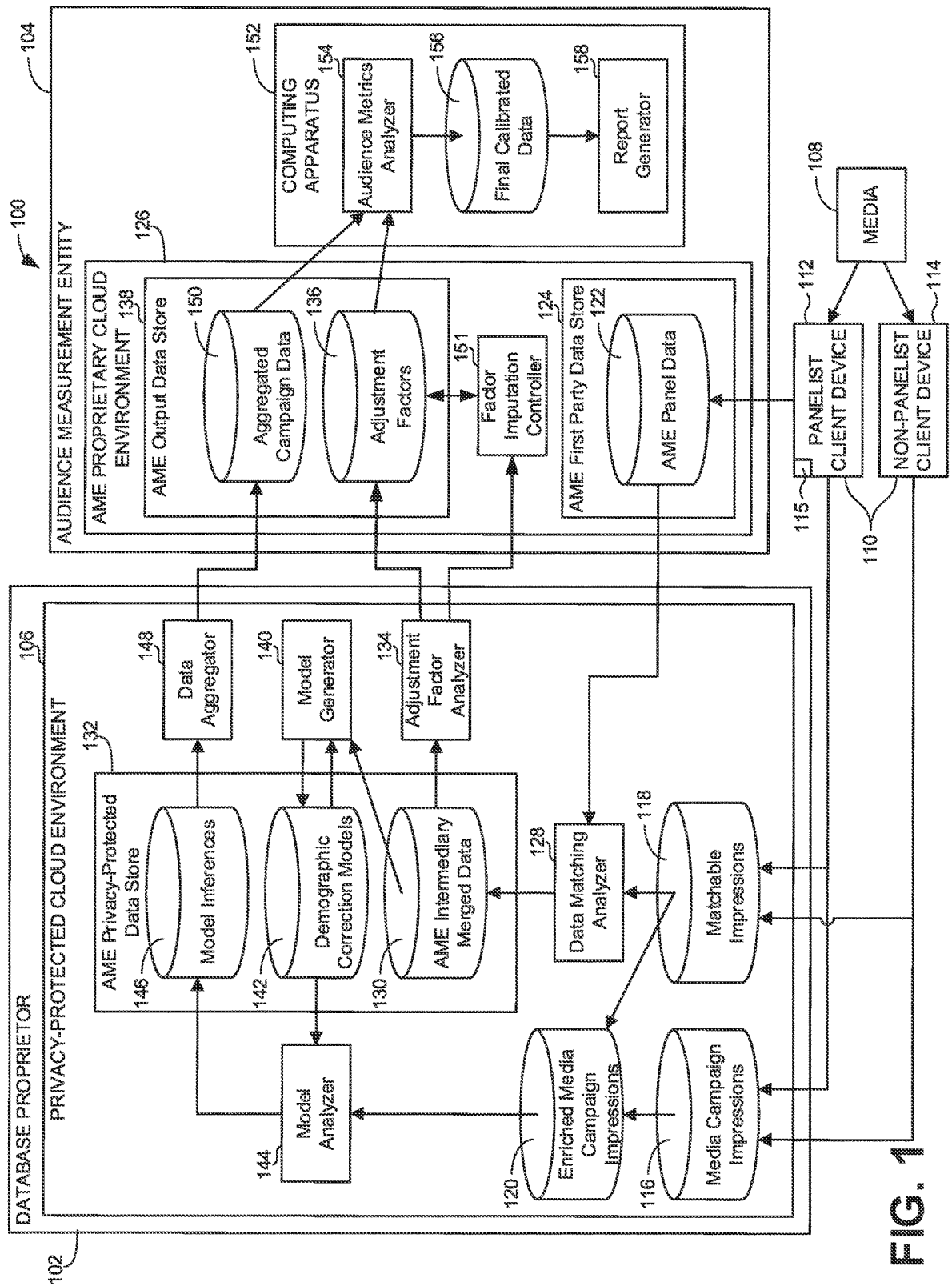
FIG. 1 is a block diagram illustrating an example system to enable the generation of audience measurement metrics based on the merging of data collected by a database proprietor and an audience measurement entity (AME).

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Audience measurement entities (AMEs) usually collect large amounts of audience measurement information from their panelists including the number of unique audience members for particular media and the number of impressions corresponding to each of the audience members. Unique audience size, as used herein, refers to the total number of unique people (e.g., non-duplicate people) who had an impression of (e.g., were exposed to) a particular media item, without counting duplicate audience members. As used herein, an impression is defined to be an event in which a home or individual accesses and/or is exposed to media (e.g., an advertisement, content, a group of advertisements and/or a collection of content). Impression count, as used herein, refers to the number of times audience members are exposed to a particular media item. The unique audience size associated with a particular media item will always be equal to or less than the number of impressions associated with the media item because, while all audience members by definition have at least one impression of the media, an individual audience member may have more than one impression. That is, the unique audience size is equal to the impression count only when every audience member was exposed to the media only a single time (i.e., the number of audience members equals the number of impressions). Where at least one audience member is exposed to the media multiple times, the unique audience size will be less than the total impression count because multiple impressions will be associated with individual audience members. Thus, unique audience size refers to the number of unique people in an audience (without double counting any person) exposed to media for which audience metrics are being generated. Unique audience size may also be referred to as unique audience, deduplicated audience size, deduplicated audience, or audience.

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, media providers serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

As Internet technology advanced, the limitations of server logs were overcome through methodologies in which the Internet media to be tracked was tagged with monitoring instructions. In particular, monitoring instructions (also known as a media impression request or a beacon request) are associated with the hypertext markup language (HTML) of the media to be tracked. When a client requests the media, both the media and the impression request are downloaded to the client. The impression requests are, thus, executed whenever the media is accessed, be it from a server or from a cache.

The beacon instructions cause monitoring data reflecting information about the access to the media (e.g., the occurrence of a media impression) to be sent from the client that downloaded the media to a monitoring server. Typically, the monitoring server is owned and/or operated by an AME (e.g., any party interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is associated with a panelist of the AME. In this manner, the AME is able to track every time a person is exposed to the media on a census-wide or population-wide level. As a result, the AME can reliably determine the total impression count for the media without having to extrapolate from panel data collected from a relatively limited pool of panelists within the population. Frequently, such beacon requests are implemented in connection with third-party cookies. Since the AME is a third party relative to the first party serving the media to the client device, the cookie sent to the AME in the impression request to report the occurrence of the media impression of the client device is a third-party cookie. Third-party cookie tracking is used by audience measurement servers to track access to media by client devices from first-party media servers.

Tracking impressions by tagging media with beacon instructions using third-party cookies is insufficient, by itself, to enable an AME to reliably determine the unique audience size associated with the media if the AME cannot identify the individual user associated with the third-party cookie. That is, the unique audience size cannot be determined because the collected monitoring information does not uniquely identify the person(s) exposed to the media. Under such circumstances, the AME cannot determine whether two reported impressions are associated with the same person or two separate people. The AME may set a third-party cookie on a client device reporting the monitoring information to identify when multiple impressions occur using the same device. However, cookie information does not indicate whether the same person used the client device in connection with each media impression. Furthermore, the same person may access media using multiple different devices that have different cookies so that the AME cannot directly determine when two separate impressions are associated with the same person or two different people.

Furthermore, the monitoring information reported by a client device executing the beacon instructions does not provide an indication of the demographics or other user information associated with the person(s) exposed to the associated media. To at least partially address this issue, the AME establishes a panel of users who have agreed to provide their demographic information and to have their Internet browsing activities monitored. When an individual joins the panel, that person provides corresponding detailed information concerning the person's identity and demographics (e.g., gender, race, income, home location, occupation, etc.) to the AME. The AME sets a cookie on the panelist computer that enables the AME to identify the panelist whenever the panelist accesses tagged media and, thus, sends monitoring information to the AME. Additionally or alternatively, the AME may identify the panelists using other techniques (independent of cookies) by, for example, prompting the user to login or identify themselves. While AMEs are able to obtain user-level information for impressions from panelists (e.g., identify unique individuals associated with particular media impressions), most of the client devices providing monitoring information from the tagged pages are not panelists. Thus, the identity of most people accessing media remains unknown to the AME such that it is necessary for the AME to use statistical methods to impute demographic information based on the data collected for panelists to the larger population of users providing data for the tagged media. However, panel sizes of AMEs remain small compared to the general population of users.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when their subscribers visit website(s) on the Internet domains of the database proprietors.

The protocols of the Internet make cookies inaccessible outside of the domain (e.g., Internet domain, domain name, etc.) on which they were set. Thus, a cookie set in, for example, the YouTube.com domain (e.g., a first party) is accessible to servers in the YouTube.com domain, but not to servers outside that domain. Therefore, although an AME (e.g., a third party) might find it advantageous to access the cookies set by the database proprietors, they are unable to do so. However, techniques have been developed that enable an AME to leverage media impression information collected in association with demographic information in subscriber databases of database proprietors to collect more extensive Internet usage (e.g., beyond the limited pool of individuals participating in an AME panel) by extending the impression request process to encompass partnered database proprietors and by using such partners as interim data collectors. In particular, this task is accomplished by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received from the AME may cause the client to send a second impression request to the database proprietor along with a cookie set by that database proprietor. In response to receiving this impression request, the database proprietor (e.g., Facebook) can access the cookie it has set on the client to thereby identify the client based on the internal records of the database proprietor.

In the event the client corresponds to a subscriber of the database proprietor (as determined from the cookie associated with the client), the database proprietor logs/records a database proprietor demographic impression in association with the client/user. As used herein, a demographic impression is an impression that can be matched to particular demographic information of a particular subscriber or registered users of the services of a database proprietor. The database proprietor has the demographic information for the particular subscriber because the subscriber would have provided such information when setting up an account to subscribe to the services of the database proprietor.

Sharing of demographic information associated with subscribers of database proprietors enables AMEs to extend or supplement their panel data with substantially reliable demographics information from external sources (e.g., database proprietors), thus extending the coverage, accuracy, and/or completeness of their demographics-based audience measurements. Such access also enables the AME to monitor persons who would not otherwise have joined an AME panel. Any web service provider having a database identifying demographics of a set of individuals may cooperate with the AME. Such web service providers may be referred to as "database proprietors" and include, for example, wireless service carriers, mobile software/service providers, social media sites (e.g., Facebook, Twitter, MySpace, etc.), online retailer sites (e.g., Amazon.com, Buy.com, etc.), multi-service sites (e.g., Yahoo!, Google, Experian, etc.), and/or any other Internet sites that collect demographic data of users and/or otherwise maintain user registration records. The use of demographic information from disparate data sources (e.g., high-quality demographic information from the panels of an audience measurement entity and/or registered user data of database proprietors) results in improved reporting effectiveness of metrics for both online and offline advertising campaigns.

The above approach to generating audience metrics by an AME depends upon the beacon requests (or tags) associated with the media to be monitored to enable an AME to obtain census wide impression counts (e.g., impressions that include the entire population exposed to the media regardless of whether the audience members are panelists of the AME). Further, the above approach also depends on third-party cookies to enable the enrichment of the census impressions with demographic information from database proprietors. However, in more recent years, there has been a movement away from the use of third-party cookies by third parties. Thus, while media providers (e.g., database proprietors) may still use first-party cookies to collect first-party data, the elimination of third-party cookies prevents the tracking of Internet media by AMEs (outside of client devices associated with panelists for which the AME has provided a meter to track Internet usage behavior). Furthermore, independent of the use of cookies, some database proprietors are moving towards the elimination of third party impression requests or tags (e.g., redirect instructions) embedded in media (e.g., beginning in 2020, third-party tags will no longer be allowed on Youtube.com and other Google Video Partner (GVP) sites). As technology moves in this direction, AMEs (e.g., third parties) will no longer be able to track census wide impressions of media in the manner they have in the past. Furthermore, AMEs will no longer be able to send a redirect request to a client accessing media to cause a second impression request to a database proprietor to associate the impression with demographic information. Thus, the only Internet media monitoring that AMEs will be able to directly perform in such a system will be with panelists that have agreed to be monitored using different techniques that do not depend on third-party cookies and/or tags.

Examples disclosed herein overcome at least some of the limitations that arise out of the elimination of third-party cookies and/or third-party tags by enabling the merging of high-quality demographic information from the panels of an AME with media impression data that continues to be collected by database proprietors. As mentioned above, while third-party cookies and/or third-party tags may be eliminated, database proprietors that provide and/or manage the delivery of media accessed online are still able to track impressions of the media (e.g., via first-party cookies and/or first-party tags). Furthermore, database proprietors are still able to associate demographic information with the impressions whenever the impressions can be matched to a particular subscriber of the database proprietor for which demographic information has been collected (e.g., when the user registered with the database proprietor). In some examples, the merging of AME panel data and database proprietor impressions data is merged in a privacy-protected cloud environment maintained by the database proprietor.

More particularly, FIG. 1 is a block diagram illustrating an example system 100 to enable the generation of audience measurement metrics based on the merging of data collected by a database proprietor 102 and an AME 104. More particularly, in some examples, the data includes AME panel data (that includes media impressions for panelists that are associated with high-quality demographic information collected by the AME 104) and database proprietor impressions data (which may be enriched with demographic and/or other information available to the database proprietor 102). In the illustrated example, these disparate sources of data are combined within a privacy-protected cloud environment 106 managed and/or maintained by the database proprietor 102. The privacy-protected cloud environment 106 is a cloud-based environment that enables media providers (e.g., advertisers and/or content providers) and third parties (e.g., the AME 104) to input and combine their data with data from the database proprietor 102 inside a data warehouse or data store that enables efficient big data analysis. The combining of data from different parties (e.g., different Internet domains) presents risks to the privacy of the data associated with individuals represented by the data from the different parties. Accordingly, the privacy-protected cloud environment 106 is established with privacy constraints that prevent any associated party (including the database proprietor 102) from accessing private information associated with particular individuals. Rather, any data extracted from the privacy-protected cloud environment 106 following a big data analysis and/or query is limited to aggregated information. A specific example of the privacy-protected cloud environment 106 is the Ads Data Hub (ADH) developed by Google.

As used herein, a media impression is defined as an occurrence of access and/or exposure to media 108 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 108 may be primary content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 108 via the Internet to users that access websites and/or online television services (e.g., web-based TV, Internet protocol TV (IPTV), etc.). For purposes of explanation, examples disclosed herein are described assuming the media 108 is an advertisement that may be provided in connection with particular content of primary interest to a user. In some examples, the media 108 is served by media servers managed by and/or associated with the database proprietor 102 that manages and/or maintains the privacy-protected cloud environment 106. For example, the database proprietor 102 may be Google, and the media 108 corresponds to ads served with videos accessed via Youtube.com and/or via other Google video partners (GVPs). More generally, in some examples, the database proprietor 102 includes corresponding database proprietor servers that can serve media 108 to individuals via client devices 110. In the illustrated example of FIG. 1, the client devices 110 may be stationary or portable computers, handheld computing devices, smart phones, Internet appliances, smart televisions, and/or any other type of device that may be connected to the Internet and capable of presenting media. For purposes of explanation, the client devices 110 of FIG. 1 include panelist client devices 112 and non-panelist client devices 114 to indicate that at least some individuals that access and/or are exposed to the media 108 correspond to panelists who have provided detailed demographic information to the AME 104 and have agreed to enable the AME 104 to track their exposure to the media 108. In many situations, other individuals who are not panelists will also be exposed to the media 108 (e.g., via the non-panelist client devices 114). Typically, the number of non-panelist audience members for a particular media item will be significantly greater than the number of panelist audience members. In some examples, the panelist client devices 112 may include and/or implement an audience measurement meter 115 that captures the impressions of media 108 accessed by the panelist client devices 112 (along with associated information) and reports the same to the AME 104. In some examples, the audience measurement meter 115 may be a separate device from the panelist client device 112 used to access the media 108.

In some examples, the media 108 is associated with a unique impression identifier (e.g., a consumer playback nonce (CPN)) generated by the database proprietor 102. In some examples, the impression identifier serves to uniquely identify a particular impression of the media 108. Thus, even though the same media 108 may be served multiple times, each time the media 108 is served the database proprietor 102 will generate a new and different impression identifier so that each impression of the media 108 can be distinguished from every other impression of the media. In some examples, the impression identifier is encoded into a uniform resource locator (URL) used to access the primary content (e.g., a particular YouTube video) along with which the media 108 (as an advertisement) is served. In some examples, with the impression identifier (e.g., CPN) encoded into the URL associated with the media 108, the audience measurement meter 115 extracts the identifier at the time that a media impression occurs so that the AME 104 is able to associate a captured impression with the impression identifier.

In some examples, the meter 115 may not be able to obtain the impression identifier (e.g., CPN) to associate with a particular media impression. For instance, in some examples where the panelist client device 112 is a mobile device, the meter 115 collects a mobile advertising identifier (MAID) and/or an identifier for advertisers (IDFA) that may be used to uniquely identify client devices 110 (e.g., the panelist client devices 112 being monitored by the AME 104). In some examples, the meter 115 reports the MAID and/or IDFA for the particular device associated with the meter 115 to the AME 104. The AME 104, in turn, provides the MAID and/or IDFA to the database proprietor 102 in a double blind exchange through which the database proprietor 102 provides the AME 104 with the impression identifiers (e.g., CPNs) associated with the client device 110 identified by the MAID and/or IDFA. Once the AME 104 receives the impression identifiers for the client device 110 (e.g., a particular panelist client device 112), the impression identifiers are associated with the impressions previously collected in connection with the device.

In the illustrated example, the database proprietor 102 logs each media impression occurring on any of the client devices 110 within the privacy-protected cloud environment 106. In some examples, logging an impression includes logging the time the impression occurred and the type of client device 110 (e.g., whether a desktop device, a mobile device, a tablet device, etc.) on which the impression occurred. Further, in some examples, impressions are logged along with the impression's unique impression identifier. In this example, the impressions and associated identifiers are logged in a campaign impressions database 116. The campaign impressions database 116 stores all impressions of the media 108 regardless of whether any particular impression was detected from a panelist client device 112 or a non-panelist client device 114. Furthermore, the campaign impressions database 116 stores all impressions of the media 108 regardless of whether the database proprietor 102 is able to match any particular impression to a particular subscriber of the database proprietor 102. As mentioned above, in some examples, the database proprietor 102 identifies a particular user (e.g., subscriber) associated with a particular media impression based on a cookie stored on the client device 110. In some examples, the database proprietor 102 associates a particular media impression with a user that was signed into the online services of the database proprietor 102 at the time the media impression occurred. In some examples, in addition to logging such impressions and associated identifiers in the campaign impressions database 116, the database proprietor 102 separately logs such impressions in a matchable impressions database 118. As used herein, a matchable impression is an impression that the database proprietor 102 is able to match to at least one of a particular subscriber (e.g., because the impression occurred on a client device 110 on which a user was signed into the database proprietor 102) or a particular client device 110 (e.g., based on a first-party cookie of the database proprietor 102 detected on the client device 110). In some examples, if the database proprietor 102 cannot match a particular media impression (e.g., because no user was signed in at the time the media impression occurred and there is no recognizable cookie on the associated client device 110) the impressions is omitted from the matchable impressions database 118 but is still logged in the campaign impressions database 116.

As indicated above, the matchable impressions database 118 includes media impressions (and associated unique impression identifiers) that the database proprietor 102 is able to match to a particular user that has registered with the database proprietor 102. In some examples, the matchable impressions database 118 also includes user-based covariates that correspond to the particular user to which each impression in the database was matched. As used herein, a user-based covariate refers to any item(s) of information collected and/or generated by the database proprietor 102 that can be used to identify, characterize, quantify, and/or distinguish particular users and/or their associated behavior. For example, user-based covariates may include the name, age, and/or gender of the user (and/or any other demographic information about the user) collected at the time the user registered with the database proprietor 102, and/or the relative frequency with which the user uses the different types of client device 110, the number of media items the user has accessed during a most recent period of time (e.g., the last 30 days), the search terms entered by the user during a most recent period of time (e.g., the last 30 days), feature embeddings (numerical representations) of classifications of videos viewed and/or searches entered by the user, etc. As mentioned above, the matchable database 118 also includes impressions matched to particular client devices 110 (based on first-party cookies), even when the impressions cannot be matched to particular users (based on the users being signed in at the time). In some such examples, the impressions matched to particular client devices 110 are treated as distinct users within the matchable database 118. However, as no particular user can be identified, such impressions in the matchable database 118 will not be associated with any user-based covariates.

Although only one campaign impressions database 116 is shown in the illustrated example, the privacy-protected cloud environment 106 may include any number of campaign impressions databases 116, with each database storing impressions corresponding to different media campaigns associated with one or more different advertisers (e.g., product manufacturers, service providers, retailers, advertisement servers, etc.). In other examples, a single campaign impressions database 116 may store the impressions associated with multiple different campaigns. In some such examples, the campaign impressions database 116 may store a campaign identifier in connection with each impression to identify the particular campaign to which the impression is associated. Similarly, in some examples, the privacy-protected cloud environment 106 may include one or more matchable impressions databases 118 as appropriate. Further, in some examples, the campaign impressions database 116 and the matchable impressions database 118 may be combined and/or represented in a single database.

In the illustrated example of FIG. 1, impressions occurring on the client devices 110 are shown as being reported (e.g., via network communications) directly to both the campaign impressions database 116 and the matchable impressions database 118. However, this should not be interpreted as necessarily requiring multiple separate network communications from the client devices 110 to the database proprietor 102. Rather, in some examples, notifications of impressions are collected from a single network communication from the client device 110, and the database proprietor 102 then populates both the campaign impressions database 116 and the matchable impressions database 118. In some examples, the matchable impressions database 118 is generated based on an analysis of the data in the campaign impressions database 116. Regardless of the particular process by which the two databases 116, 118 are populated with logged impressions, in some examples, the user-based covariates included in the matchable impressions database 118 may be combined with the logged impressions in the campaign impressions database 116 and stored in an enriched impressions database 120. Thus, the enriched impressions database includes all (e.g., census wide) logged impressions of the media 108 for the relevant advertising campaign and also includes all available user-based covariates associated with each of the logged impressions that the database proprietor 102 was able to match to a particular user.

As shown in the illustrated example, whereas the database proprietor 102 is able to collect impressions from both panelist client devices 112 and non-panelist client devices 114, the AME 104 is limited to collecting impressions from panelist client devices 112. In some examples, the AME 104 also collects the impression identifier associated with each collected media impression so that the collected impressions may be matched with the impressions collected by the database proprietor 102 as described further below. In the illustrated example, the impressions (and associated impression identifiers) of the panelists are stored in an AME panel data database 122 that is within an AME first party data store 124 in an AME proprietary cloud environment 126. In some examples, the AME proprietary cloud environment 126 is a cloud-based storage system (e.g., a Google Cloud Project) provided by the database proprietor 102 that includes functionality to enable interfacing with the privacy-protected cloud environment 106 also maintained by the database proprietor 102. As mentioned above, the privacy-protected cloud environment 106 is governed by privacy constraints that prevent any party (with some limited exceptions for the database proprietor 102) from accessing private information associated with particular individuals. By contrast, the AME proprietary cloud environment 126 is indicated as proprietary because it is exclusively controlled by the AME such that the AME has full control and access to the data without limitation. While some examples involve the AME proprietary cloud environment 126 being a cloud-based system that is provided by the database proprietor 102, in other examples, the AME proprietary cloud environment 126 may be provided by a third party distinct from the database proprietor 102.

While the AME 104 is limited to collected impressions (and associated identifiers) from only panelists (e.g., via the panelist client devices 112), the AME 104 is able to collect panel data that is much more robust than merely media impressions. As mentioned above, the panelist client devices 112 are associated with users that have agreed to participate on a panel of the AME 104. Participation in a panel includes the provision of detailed demographic information about the panelist and/or all members in the panelist's household. Such demographic information may include age, gender, race, ethnicity, education, employment status, income level, geographic location of residence, etc. In addition to such demographic information, which may be collected at the time a user enrolls as a panelist, the panelist may also agree to enable the AME 104 to track and/or monitor various aspects of the user's behavior. For example, the AME 104 may monitor panelists' Internet usage behavior including the frequency of Internet usage, the times of day of such usage, the websites visited, and the media exposed to (from which the media impressions are collected).

AME panel data (including media impressions and associated identifiers, demographic information, and Internet usage data) is shown in FIG. 1 as being provided directly to the AME panel data database 122 from the panelist client devices 112. However, in some examples, there may be one or more intervening operations and/or components that collect and/or process the collected data before it is stored in the AME panel data database 122. For instance, in some examples, impressions are initially collected and reported to a separate server and/or database that is distinct from the AME proprietary cloud environment 126. In some such examples, this separate server and/or database may not be a cloud-based system. Further, in some examples, such a non-cloud-based system may interface directly with the privacy-protected cloud environment 106 such that the AME proprietary cloud environment 126 may be omitted entirely.

In some examples, there may be multiple different techniques and/or methodologies used to collect the AME panel data that depends on the particular circumstances involved. For example, different monitoring techniques and/or different types of audience measurement meters 115 may be employed for media accessed via a desktop computer relative to the media accessed via a mobile computing device. In some examples, the audience measurement meter 115 may be implemented as a software application that panelists agree to install on their devices to monitor all Internet usage activity on the respective devices. In some examples, the meter 115 may prompt a user of a particular device to identify themselves so that the AME 104 can confirm the identity of the user (e.g., whether it was the mother or daughter in a panelist household). In some examples, prompting a user to self-identify may be considered overly intrusive. Accordingly, in some such examples, the circumstances surrounding the behavior of the user of a panelist client device 112 (e.g., time of day, type of content being accessed, etc.) may be analyzed to infer the identity of the user to some confidence level (e.g., the accessing of children's content in the early afternoon would indicate a relatively high probability that a child is using the device at that point in time). In some examples, the audience measurement meter 115 may be a separate hardware device that is in communication with a particular panelist client device 112 and enabled to monitor the Internet usage of the panelist client device 112.

In some examples, the processes and/or techniques used by the AME 104 to capture panel data (including media impressions and who in particular was exposed to the media) can differ depending on the nature of the panelist client device 112 through which the media was accessed. For instance, in some examples, the identity of the individual using the client device 112 may be based on the individual responding to a prompt to self-identify. In some examples, such prompts are limited to desktop client devices because such a prompt is viewed as overly intrusive on a mobile device. However, without specifically prompting a user of a mobile device to self-identify, there often is no direct way to determine whether the user is the primary user of the device (e.g., the owner of the device) or someone else (e.g., a child of the primary user). Thus, there is the possibility of misattribution of media impressions within the panel data collected using mobile devices. In some examples, to overcome the issue of misattribution in the panel data, the AME 104 may develop a machine learning model that can predict the true user of a mobile device (or any device for that matter) based on information that the AME 104 does know for certain and/or has access to. For example, inputs to the machine learning model may include the composition of the panelist household, the type (e.g., genre and/or category) of the content, the daypart or time of day when the content was accessed, etc. In some examples, the truth data used to generate and validate such a model may be collected through field surveys in which the above input features are tracked and/or monitored for a subset of panelists that have agreed to be monitored in this manner (which is more intrusive than the typical passive monitoring of content accessed via mobile devices).

As mentioned above, in some examples, the AME panel data (stored in the AME panel data database 122) is merged with the database proprietor impressions data (stored in the matchable impressions database 118) within the privacy-protected cloud environment 106 to take advantage of the combination of the disparate sets of data to generate more robust and/or reliable audience measurement metrics. In particular, the database proprietor impressions data provides the advantage of volume. That is, the database proprietor impressions data corresponds to a much larger number of impressions than the AME panel data because the database proprietor impressions data includes census wide impression information that includes all impressions collected from both the panelist client devices 112 (associated with a relatively small pool of audience members) and the non-panelist client devices 114. The AME panel data provides the advantage of high-quality demographic data for a statistically significant pool of audience members (e.g., panelists) that may be used to correct for errors and/or biases in the database proprietor impressions data.

One source of error in the database proprietor impressions data is that the demographic information for matchable users collected by the database proprietor 102 during user registration may not be truthful. In particular, in some examples, many database proprietors impose age restrictions on their user accounts (e.g., a user must be at least 13 years of age, at least 18 years of age, etc.). However, when a person registers with the database proprietor 102, the user typically self-declares their age and may, therefore, lie about their age (e.g., an 11 year old may say they are 18 to bypass the age restrictions for a user account). Independent of age restrictions, a particular user may choose to enter an incorrect age for any other reason or no reason at all (e.g., a 44 year old may choose to assert they are only 25). Where a database proprietor 102 does not verify the self-declared age of users, there is a relatively high likelihood that the ages of at least some registered users of the database proprietor stored in the matchable impressions database 118 (as a particular user-based covariate) are inaccurate. Further, it is possible that other self-declared demographic information (e.g., gender, race, ethnicity, income level, etc.) may also be falsified by users during registration. As described further below, the AME panel data (which contains reliable demographic information about the panelists) can be used to correct for inaccurate demographic information in the database proprietor impressions data.

Another source of error in the database proprietor impressions data is based on the concept of misattribution, which arises in situations where multiple different people use the same client device 110 to access media. In some examples, the database proprietor 102 associates a particular impression to a particular user based on the user being signed into a platform provided by the database proprietor. For example, if a particular person signs into their Google account and begins watching a YouTube video on a particular client device 110, that person will be attributed with an impression for an ad served during the video because the person was signed in at the time. However, there may be instances where the person finishes using the client device 110 but does not sign out of his or her Google account. Thereafter, a second different person (e.g., a different member in the family of the first person) begins using the client device 110 to view another YouTube video. Although the second person is now accessing media via the client device 110, ad impressions during this time will still be attributed to the first person because the first person is the one who is still indicated as being signed in. Thus, there is likely to be circumstances where the actual person exposed to media 108 is misattributed to a different registered user of the database proprietor 102. The AME panel data (which includes an indication of the actual person using the panelist client devices 112 at any given moment) can be used to correct for misattribution in the demographic information in the database proprietor impressions data. As mentioned above, in some situations, the AME panel data may itself include misattribution errors. Accordingly, in some examples, the AME panel data may first be corrected for misattribution before the AME panel data is used to correct misattribution in the database proprietor impressions data. An example methodology to correct for misattribution in the database proprietor impressions data is described in Singh et al., U.S. Pat. No. 10,469,903, which is hereby incorporated herein by reference in its entirety.

Another problem with the database proprietor impressions data is that of non-coverage. Non-coverage refers to impressions recorded by the database proprietor 102 that cannot be matched to a particular registered user of the database proprietor 102. The inability of the database proprietor 102 to match a particular impression to a particular user can occur for several reasons including that the user is not signed in at the time of the media impression, that the user has not established an account with the database proprietor 102, that the user has enabled Limited Ad Tracking (LAT) to prevent the user account from being associated with ad impressions, or that the content associated with the media being monitored corresponds to children's content (for which user-based tracking is not performed). While the inability of the database proprietor 102 to match and assign a particular impression to a particular user is not necessarily an error in the database proprietor impressions data, it does undermine the ability to reliably estimate the total unique audience size for (e.g., the number of unique individuals that were exposed to) a particular media item. For example, assume that the database proprietor 102 records a total of 11,000 impressions for media 108 in a particular advertising campaign. Further assume that of those 11,000 impressions, the database proprietor 102 is able to match 10,000 impressions to a total of 5,000 different users (e.g., each user was exposed to the media on average 2 times) but is unable to match the remaining 1,000 impressions to particular users. Relying solely on the database proprietor impressions data, in this example, there is no way to determine whether the remaining 1,000 impressions should also be attributed to the 5,000 users already exposed at least once to the media 108 (for a total audience size of 5,000 people) or if one or more of the remaining 1,000 impressions should be attributed to other users not among the 5,000 already identified (for a total audience size of up to 6,000 people (if every one of the 1,000 impressions was associated with a different person not included in the matched 5,000 users)). In some examples disclosed herein, the AME panel data can be used to estimate the distribution of impressions across different users associated with the non-coverage portion of impressions in the database proprietor impressions data to thereby estimate a total audience size for the relevant media 108.

Another confounding factor to the estimation of the total unique audience size for media based on the database proprietor impressions data is the existence of multiple user accounts of a single user. More particular, in some situations a particular individual may establish multiple accounts with the database proprietor 102 for different purposes (e.g., a personal account, a work account, a joint account shared with other individuals, etc.). Such a situation can result in a larger number of different users being identified as audience members to media 108 than the actual number of individuals exposed to the media 108. For example, assume that a particular person registers three user accounts with the database proprietor 102 and is exposed to the media 108 once while signed into each of the three different accounts for a total of three impressions. In this scenario, the database proprietor 102 would match each impression to a different user based on the different user accounts making it appear that three different people were exposed to the media 108 when, in fact, only one person was exposed to the media three different times. Examples disclosed herein use the AME panel data in conjunction with the database proprietor impressions data to estimate an actual unique audience size from the potentially inflated number of apparently unique users exposed to the media 108.

In the illustrated example of FIG. 1, the AME panel data is merged with the database proprietor impressions data by an example data matching analyzer 128. In some examples, the data matching analyzer 128 implements an application programming interface (API) that takes the disparate datasets and matches users in the database proprietor impressions data with panelists in the AME panel data. In some examples, users are matched with panelists based on the unique impression identifiers (e.g., CPNs) collected in connection with the media impressions logged by both the database proprietor 102 and the AME 104. The combined data is stored in an intermediary merged data database 130 within an AME privacy-protected data store 132. The data in the intermediary merged data database 130 is referred to as "intermediary" because it is at an intermediate stage in the processing because it includes AME panel data that has been enhanced and/or combined with the database proprietor impressions data, but has not yet be corrected or adjusted to account for the sources of error and/or bias in the database proprietor impressions data as outlined above.

In some examples, the AME intermediary merged data is analyzed by an adjustment factor analyzer 134 to calculate adjustment or calibration factors that may be stored in an adjustment factors database 136 within an AME output data store 138 of the AME proprietary cloud environment 126. In some examples, the adjustment factor analyzer 134 calculates different types of adjustment factors to account for different types of errors and/or biases in the database proprietor impressions data. For instance, a multi-account adjustment factor corrects for the situation of a single user accessing media using multiple different user accounts associated with the database proprietor 102. A signed-out adjustment factor corrects for non-coverage associated with users that access media while signed out of their account associated with the database proprietor 102 (so that the database proprietor 102 is unable to associate the impression with the users). In some examples, the adjustment factor analyzer 134 is able to directly calculate the multi-account adjustment factor and the signed-out adjustment factor in a deterministic manner.

While the multi-account adjustment factors and the signed-out adjustment factors may be deterministically calculated, correcting for falsified or otherwise incorrect demographic information (e.g., incorrectly self-declared ages) of registered users of the database proprietor 102 cannot be solved in such a direct and deterministic manner. Rather, in some examples, a machine learning model is developed to analyze and predict the correct ages of registered users of the database proprietor 102. Specifically, as shown in FIG. 1, the privacy-protected cloud environment 106 implements a model generator 140 to generate a demographic correction model using the AME intermediary merged data (stored in the AME intermediary merged data database 130) as inputs. More particularly, in some examples, self-declared demographics (e.g., the self-declared age) of users of the database proprietor 102, along with other covariates associated with the users, are used as the input variables or features used to train a model to predict the correct demographics (e.g., correct age) of the users as validated by the AME panel data, which serves as the truth data or training labels for the model generation. In some examples, different demographic correction model(s) may be developed to correct for different types of demographic information that needs correcting. For instance, in some examples, a first model can be used to correct the self-declared age of users of the database proprietor 102 and a second model can be used to correct the self-declared gender of the users. Once the model(s) have been trained and validated based on the AME panel data, the model(s) are stored in a demographic correction models database 142.

As mentioned above, there are many different types of covariates collected and/or generated by the database proprietor 102. In some examples, the covariates provided by the database proprietor 102 may include a certain number (e.g., 100) of the top search result click entities and/or video watch entities for every user during a most recent period of time (e.g., for the last month). These entities are integer identifiers (IDs) that map to a knowledge graph of all entities for the search result clicks and/or videos watched. That is, as used in this context, an entity corresponds to a particular node in a knowledge graph maintained by the database proprietor 102. In some examples, the total number of unique IDs in the knowledge graph may number in the tens of millions. More particularly, for example, YouTube videos are classified across roughly 20 million unique video entity IDs and Google search results are classified across roughly 25 million unique search result entity IDs. In addition to the top search result click entities and/or video watch entities, the database proprietor 102 may also provide embeddings for these entities. An embedding is a numerical representation (e.g., a vector array of values) of some class of similar objects, images, words, and the like. For example, a particular user that frequently searches for and/or views cat videos may be associated with a feature embedding representative of the class corresponding to cats. Thus, feature embeddings translate relatively high dimensional vectors of information (e.g., text strings, images, videos, etc.) into a lower dimensional space to enable the classification of different but similar objects.

In some examples, multiple embeddings may be associated with each search result click entity and/or video watch entity. Accordingly, assuming the top 100 search result entities and video watch entities are provided among the covariates and that 16 dimension embeddings are provided for each such entity, this results in a 100×16 matrix of values for every user, which may be too much data to process during generation of the demographic correction models as described above. Accordingly, in some examples, the dimensionality of the matrix is reduced to a more manageable size to be used as an input feature for the demographic correction model generation.

In some examples, a process is implemented to track different demographic correction model experiments over time to achieve high quality (e.g., accurate) models and also for auditing purposes. Accomplishing this objective within the context of the privacy-protected cloud environment 106 presents several unique challenges because the model features (e.g., inputs and hyperparameters) and model performance (e.g., accuracy) are stored separately to satisfy the privacy constraints of the environment.

In some examples, a model analyzer 144 may implement and/or use one or more demographic correction models to generate predictions and/or inferences as to the actual demographics (e.g., actual ages) of users associated with media impressions logged by the database proprietor 102. That is, in some examples, as shown in FIG. 1, the model analyzer 144 uses one or more of the demographic correction models in the demographic correction models database 142 to analyze the impressions in the enriched impressions database 120 that were matched to a particular user of the database proprietor 102. The inferred demographic (e.g., age) for each user may be stored in a model inferences database 146 for subsequent use, retrieval, and/or analysis. Additionally or alternatively, in some examples, the model analyzer 144 uses one or more of the demographic correction models in the demographic correction models database 142 to analyze the entire user base of the database proprietor regardless of whether the users are matched to any particular media impressions. After inferring the correct demographic (e.g., age) for each user, the inferences are stored in the model inferences database 146. In some such examples, when the users matched to particular impressions are to be analyzed (e.g., the users matched to impressions in the enriched impressions database 120), the model analyzer 144 merely extracts the inferred demographic assignment to each relevant user in the enriched impressions database 120 that matches with one or more media impressions.

As described above, in some examples, the database proprietor 102 may identify a particular user as corresponding to a particular impression based on the user being signed into the database proprietor 102. However, there are circumstances where the individual corresponding to the user account is not the actual person that was exposed to the relevant media. Accordingly, merely inferring a correct demographic (e.g., age) of the user associated with the signed in user account may not be the correct demographic of the actual person to which a particular media impression should be attributed. In other words, whereas the AME panelist data and the database proprietor impressions data is matched at the impression level, demographic correction is implemented at the user level. Therefore, before generating the demographic correction model, a method to reduce logged impressions to individual users is first implemented so that the demographic correction model can be reliably implemented.

With inferences made to correct for inaccurate demographic information of database proprietor users (e.g., falsified self-declared ages) and stored in the model inferences database 146, the AME 104 may be interested in extracting audience measurement metrics based on the corrected data. However, as mentioned above, the data contained inside the privacy-protected cloud environment 106 is subject to privacy constraints. In some examples, the privacy constraints ensure that the data can only be extracted for review and/or analysis in aggregate so as to protect the privacy of any particular individual represented in the data (e.g., a panelist of the AME 104 and/or a registered user of the database proprietor 102). Accordingly, in some examples, a data aggregator 148 aggregates the audience measurement data associated with particular media campaigns before the data is provided to an aggregated campaign data database 150 in the AME output data store 138 of the AME proprietary cloud environment 126.

The data aggregator 148 may aggregate data in different ways for different types of audience measurement metrics. For instance, at the highest level, the aggregated data may provide the total impression count and total number of users (e.g., estimated audience size) exposed to the media 108 for a particular media campaign. As mentioned above, the total number of users reported by the data aggregator 148 is based on the total number of unique user accounts matched to impressions but does not include the individuals associated with impressions that were not matched to a particular user (e.g., non-coverage). However, the total number of unique user accounts does not account for the fact that a single individual may correspond to more than one user account (e.g., multi-account users), and does not account for situations where a person other than a signed-in user was exposed to the media 108 (e.g., misattribution). These errors in the aggregated data may be corrected based on the adjustment factors stored in the adjustment factors database 136. Further, in some examples, the aggregated data may include an indication of the demographic composition of the users represented in the aggregated data (e.g., number of males vs females, number of users in different age brackets, etc.).

Additionally or alternatively, in some examples, the data aggregator 148 may provide aggregated data that is associated with a particular aspect of a media campaign. For instance, the data may be aggregated based on particular sites (e.g., all media impressions served on YouTube.com). In other examples, the data may be aggregated based on placement information (e.g., aggregated based on particular primary content videos accessed by users when the media advertisement was served). In other examples, the data may be aggregated based on device type (e.g., impressions served via a desktop computer versus impressions served via a mobile device). In other examples, the data may be aggregated based on a combination of one or more of the above factors and/or based on any other relevant factor(s).

In some examples, the privacy constraints imposed on the data within the privacy-protected cloud environment 106 include a limitation that data cannot be extracted (even when aggregated) for less than a threshold number of individuals (e.g., 50 individuals). In some examples, the data cannot be extracted when one or more additional sample size criteria are not satisfied (e.g., a number of impressions is less than an impressions threshold). Accordingly, if the particular metric being sought includes less than the threshold number of individuals and/or impressions, the data aggregator 148 will not provide such data. For instance, if the threshold number of individuals is 50 but there are only 46 females in the age range of 18-25 that were exposed to particular media 108, the data aggregator 148 would not provide the aggregate data for females in the 18-25 age bracket. Such privacy constraints can leave gaps in the audience measurement metrics, particularly in locations where the number of panelists is relatively small. Accordingly, in some examples, when audience measurement is not available for a particular demographic segment of interest in a particular region (e.g., a particular country), the audience measurement metrics in one or more comparable region(s) may be used to impute the metrics for the missing data in the first region of interest. In some examples, the particular metrics imputed from comparable regions is based on a comparison of audience metrics for which data is available in both regions.

In the illustrated example of FIG. 1, an example factor imputation controller 151 is implemented in the AME proprietary cloud environment 126. In some examples, the factor imputation controller 151 calculates imputation factors when aggregate data for one or more audience measurement metrics are not available. For example, privacy constraints may prevent such aggregate data from being extracted from the privacy-protected cloud environment 106 for less than a threshold number of panelists and/or impressions. In some examples, the factor imputation controller 151 calculates the imputation factor(s) based on initial adjustment factors generated by the adjustment factor analyzer 134. In some examples, the factor imputation controller 151 updates the adjustment factors database 136 based on the calculated imputation factors to correct for missing data from one or more regions and/or demographics of interest based on available data from one or more other regions and/or demographics of interest. As a specific example, while data for females in the 18-25 age bracket may be unavailable in a particular region (e.g., due to privacy constraints on the aggregation of less than a threshold number of females in the bracket), assume that data for females in the 26-35 age bracket is available (e.g., the number of females in the age bracket satisfies the threshold defined by the privacy constraints). The metrics associated with the 26-35 age bracket in the particular region of interests may be compared with metrics for the 26-35 age bracket in other regions and the regions with the closest metrics to the region of interest may be selected for use in calculating imputation factor(s). While the factor imputation controller 151 is implemented in the AME proprietary cloud environment 126 in this example, the factor imputation controller 151 can be implemented in the privacy-protected cloud environment 106 in other examples. Additionally or alternatively, in some examples, some or all of the functions of the factor imputation controller 151 may be implemented by the adjustment factor analyzer 134.

As shown in the illustrated example, both the adjustment factors database 136 and the aggregated campaigns data database 150 are included within the AME output data store 138 of the AME proprietary cloud environment 126. As mentioned above, in some examples, the AME proprietary cloud environment 126 is provided by the database proprietor 102 and enables data to be provided to and retrieved from the privacy-protected cloud environment. In some examples, the aggregated campaign data and the adjustment factors are subsequently transferred to a separate computing apparatus 152 of the AME 104 for analysis by an audience metrics analyzer 154. In some examples, the separate computing apparatus may be omitted with its functionality provided by the AME proprietary cloud environment 126. In other examples, the AME proprietary cloud environment 126 may be omitted with the adjustment factors and the aggregated data provided directly to the computing apparatus 152. Further, in this example, the AME panel data database 122 is within the AME first party data store 124, which is shown as being separate from the AME output data store 138. However, in other examples, the AME first party data store 124 and the AME output data store 138 may be combined.

In the illustrated example of FIG. 1, the audience metrics analyzer 154 applies the adjustment factors to the aggregated data to correct for errors in the data including misattribution, non-coverage, and multi-count users. The output of the audience metrics analyzer 154 corresponds to the final calibrated data of the AME 104 and is stored in a final calibrated data database 156. In this example, the computing apparatus 152 also includes a report generator 158 to generate reports based on the final calibrated data.

Figure 2:
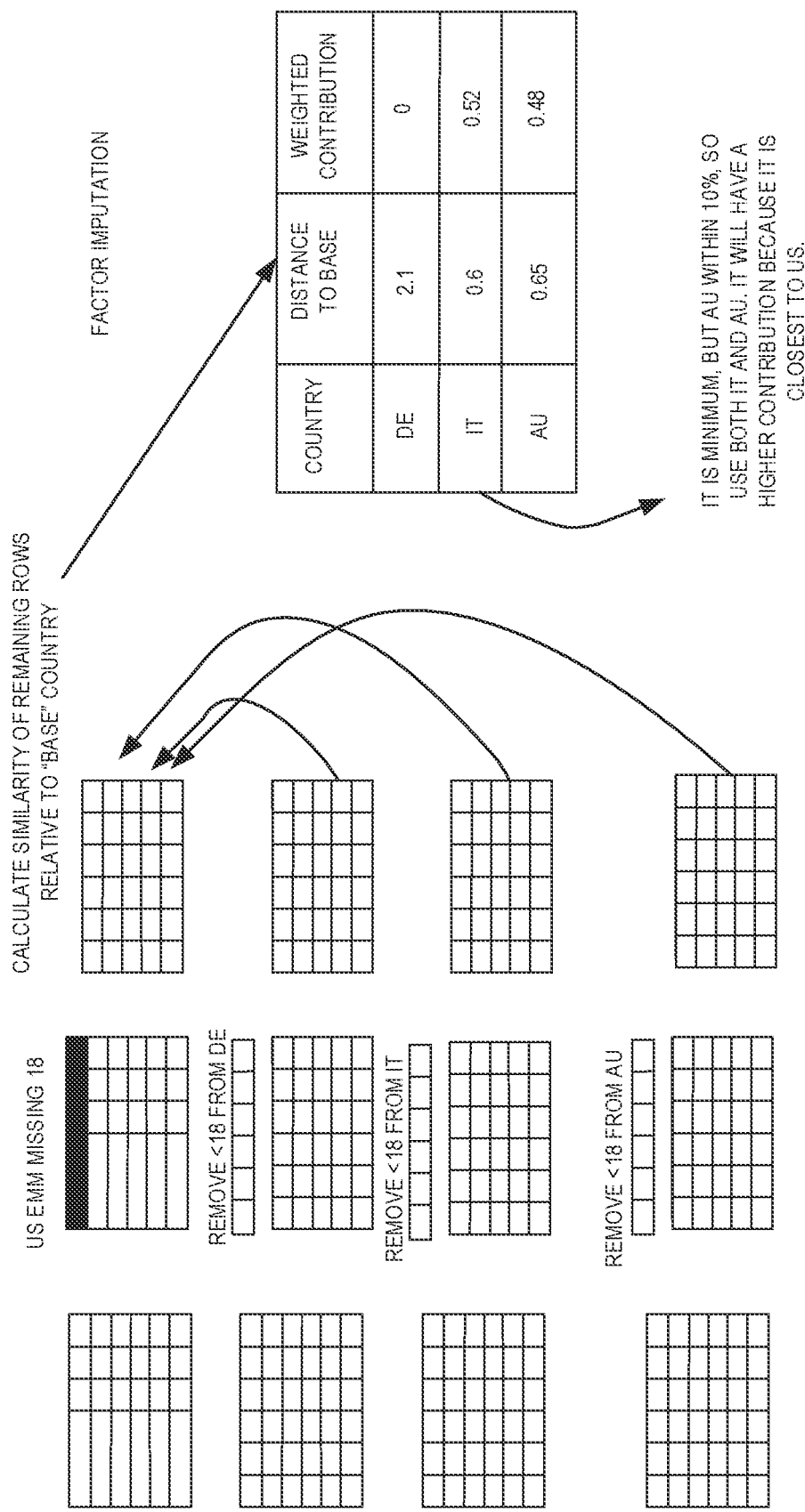
FIG. 2 illustrates an example process flow to calculate imputation factors to impute audience measurement metrics from a second region to a first region for which such metrics are unavailable or otherwise incomplete.

An example process of calculating imputation factors is demonstrated in FIG. 2. In this example, the missing data to be imputed corresponds to data associated with individuals under 18 years of age in the United States. The data from three different countries are shown as possible candidates to rely on for the imputation factors including Germany (DE), Italy (IT), and Australia (AU). As represented in FIG. 2, the data corresponding to what is missing in the United States (e.g., data for individuals under 18) is omitted from the data from each of the other countries and then compared to the US data that is available (e.g., data for all age brackets 18 and older). The difference (or distance) between the US data and the other countries is shown in the table at the right in FIG. 2. As shown in the table, the Italy data is the closest to the US data and so may be selected as a surrogate to provide the data missing in the US. However, in the illustrated example, the Australia data is almost as close as the Italy data and so both are selected for imputation to the US data. However, the Italy data is weighted slightly higher than the Australia data because the Italy data was closer to the US data. The weight contributions correspond to the imputation factors that are multiplied against the corresponding Italy data and Australia data to arrive at the final imputed values for the missing US data. More specifically, in the illustrated example, the imputation factors generated based on the data for individuals 18 and older is multiplied against the corresponding data for individuals under 18 years old in Italy and Australia to impute corresponding data for individuals under 18 years old in the US.

In some examples, imputation factors are calculated to correct and/or adjust adjustment factors that are generated or estimated based on missing and/or incomplete data. Some such adjustment factors include a non-coverage adjustment factor and/or a misattribution adjustment factor. The non-coverage adjustment factor accounts for impressions that the database proprietor 102 is unable to match with a particular individual (e.g., because the individuals were not signed into their user accounts with the database proprietor 102 when the impressions occurred). The misattribution adjustment factor accounts for media impressions attributed to one person (e.g., based on that person being signed into his or her user account) that should be attributed to a different person (e.g., the person actually accessing media while the first person is still signed in).). Once corrected to account for inaccuracies and/or gaps in the data, such adjustment factors (e.g., the non-coverage adjustment factor and/or the misattribution adjustment factor) can be applied to aggregated data in the aggregated campaign data database 150 of FIG. 1 to reduce error due to misattribution and/or non-coverage of impressions in the aggregated data. In some examples, the adjustment factors are generated based on data in the AME intermediary merged data database 130 of the privacy-protected cloud environment 106. However, in some examples, privacy constraints are imposed on the extraction of data from the privacy-protected cloud environment 106 when the data does not satisfy a threshold audience or impressions count. As such, some of the aggregated data in the aggregated campaign data database 150 may be missing and/or incomplete. In some such examples, missing and/or incomplete aggregated data reduces reliability of the audience measurement metrics generated based on the aggregated data. Furthermore, the adjustment factors generated based on missing and/or incomplete data (e.g., data that does not satisfy the threshold audience count or impressions count) may not reliability correct the error due to non-coverage and/or misattribution of impressions in the aggregated data.

In one example, when the missing data corresponds to data associated with a given demographic (e.g., individuals under 18 years of age in the United States), the adjustment factors calculated based on the US data for the given demographic may not reliably correct the misattribution and/or non-coverage error in the aggregated data. In some examples, to improve the reliability of the adjustment factors in correcting such error, the adjustment factors can be imputed for the given demographic, and the imputed adjustment factors can be applied to the aggregated data in the aggregated campaign data database 150 to reliably reduce the error due to misattribution and/or non-coverage of impressions.

In some examples, the misattribution adjustment factor is applied to aggregated data in the aggregated campaign data database 150 to correct for error due to misattribution. In this example, multiple misattribution adjustment factors are included in an example misattribution matrix, where rows of the misattribution matrix correspond to actual demographics of audience members associated with logged impressions (e.g., as determined from AME panel data) and columns of the misattribution matrix correspond to logged demographics of audience members associated with the logged impressions (e.g., as determined by the database proprietor 102 based on the user accounts associated with the impressions). In some examples, the rows and columns may be reversed and/or the actual and logged demographics associated with logged impressions may be represented and/or processed in any other suitable format. The demographics represented in an example misattribution matrix may be based on any suitable demographic (e.g., age, gender, income, ethnicity, geographic location, etc.). In some examples, each row and column in an example misattribution matrix corresponds to a particular combination of multiple demographics. For instance, a first demographic may correspond to females aged 18-20 and a second demographic is females aged 21-24. In some examples, multiple different misattribution matrices may be generated for different types of media devices used to access media (e.g., a first matrix for impressions logged using mobile devices and a second matrix for impressions logged using desktop devices). Additionally or alternative, multiple different misattribution matrices (with the same demographic and/or device type breakdowns) may be generated for different geographic regions (e.g., different countries). In some examples, the misattribution adjustment factor corresponding to column i and row j of a misattribution matrix indicates a probability that, for a logged impression, the database proprietor 102 associated the logged impression with an audience member corresponding to the logged demographic of column i (e.g., corresponding to a first demographic) given that the actual demographic for the logged impression corresponds to the demographic of row j (e.g., a different demographic).

In some examples, the non-coverage adjustment factor is applied to the aggregated campaign data 150 of to correct for error due to non-coverage of impressions. In some examples, multiple non-coverage adjustment factors are included in a non-coverage adjustment vector, where the non-coverage adjustment factor corresponding to element k of the non-coverage adjustment vector corresponds to a given demographic or given combination of multiple demographics similar to the misattribution matrices discussed above. Further, in some examples, multiple different non-coverage vectors may be generated for different types of media devices used to access media (e.g., a first vector for impressions logged using mobile devices and a second vector for impressions logged using desktop devices). Additionally or alternative, multiple different non-coverage vectors (with the same demographic and/or device type breakdowns) may be generated for different geographic regions (e.g., different countries). In some examples, each non-coverage adjustment factor in a non-coverage adjustment vector represents a ratio of covered AME panelists (e.g., panelists matched to particular user accounts by the database proprietor 102) to the total audience count of unique AME panelists (e.g., including the covered AME panelists and non-covered AME panelists) associated with the given demographic.

In some examples, the imputation factor for non-coverage is calculated differently than the imputation factor for misattribution. For instance, in some examples, the comparison of the different candidate regional data to the data corresponding to the region of interest to adjust misattribution is made by calculating the Euclidean distance between the misattribution matrix of the region of interest (e.g., the US data in FIG. 2) and the misattribution matrix for each donor region (e.g., the DE, IT, AU data in FIG. 2). By contrast, in some examples, the comparison of the different candidate regional data to the data corresponding to the region of interest to adjust non-coverage is made by calculating the cosine similarity between the vector of non-coverage factors (e.g., a vector containing non-coverage factors for all demographics) of the region of interest (e.g., the US data in FIG. 2) and the vector of non-coverage factors for each donor region (e.g., the DE, IT, AU data in FIG. 2). The process of calculating imputation factors is described in further detail below in connection with FIGS. 3, 4, 5, and/or 6.

While an example manner of implementing the privacy-protected cloud environment 106 of FIG. 1 is illustrated in FIG. 1, one or more of the elements, processes and/or devices illustrated in FIG. 1 may be combined, divided, re-arranged, omitted, eliminated and/or implemented in any other way. Further, the example campaign impressions database 116, example matchable impressions database 118, the example enriched campaign impressions database 120, the example data matching analyzer 128, the example AME intermediary merged data database 130, the example AME privacy-protected data store 132, the example adjustment factor analyzer 134, the example model generator 140, the example demographic correction models database 142, the example model analyzer 144, the example model inferences database 146, the example data aggregator 148, the example factor imputation controller 151, and/or, more generally, the example privacy-protected cloud environment 106 of FIG. 1 may be implemented by hardware, software, firmware and/or any combination of hardware, software and/or firmware. Thus, for example, any of the example campaign impressions database 116, example matchable impressions database 118, the example enriched campaign impressions database 120, the example data matching analyzer 128, the example AME intermediary merged data database 130, the example AME privacy-protected data store 132, the example adjustment factor analyzer 134, the example model generator 140, the example demographic correction models database 142, the example model analyzer 144, the example model inferences database 146, the example data aggregator 148, the example factor imputation controller 151, and/or, more generally, the example privacy-protected cloud environment 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example campaign impressions database 116, example matchable impressions database 118, the example enriched campaign impressions database 120, the example data matching analyzer 128, the example AME intermediary merged data database 130, the example AME privacy-protected data store 132, the example adjustment factor analyzer 134, the example model generator 140, the example demographic correction models database 142, the example model analyzer 144, the example model inferences database 146, the example data aggregator 148, and/or the example factor imputation controller 151 is/are hereby expressly defined to include a non-transitory computer readable storage device or storage disk such as a memory, a digital versatile disk (DVD), a compact disk (CD), a Blu-ray disk, etc. including the software and/or firmware. Further still, the example privacy-protected cloud environment 106 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
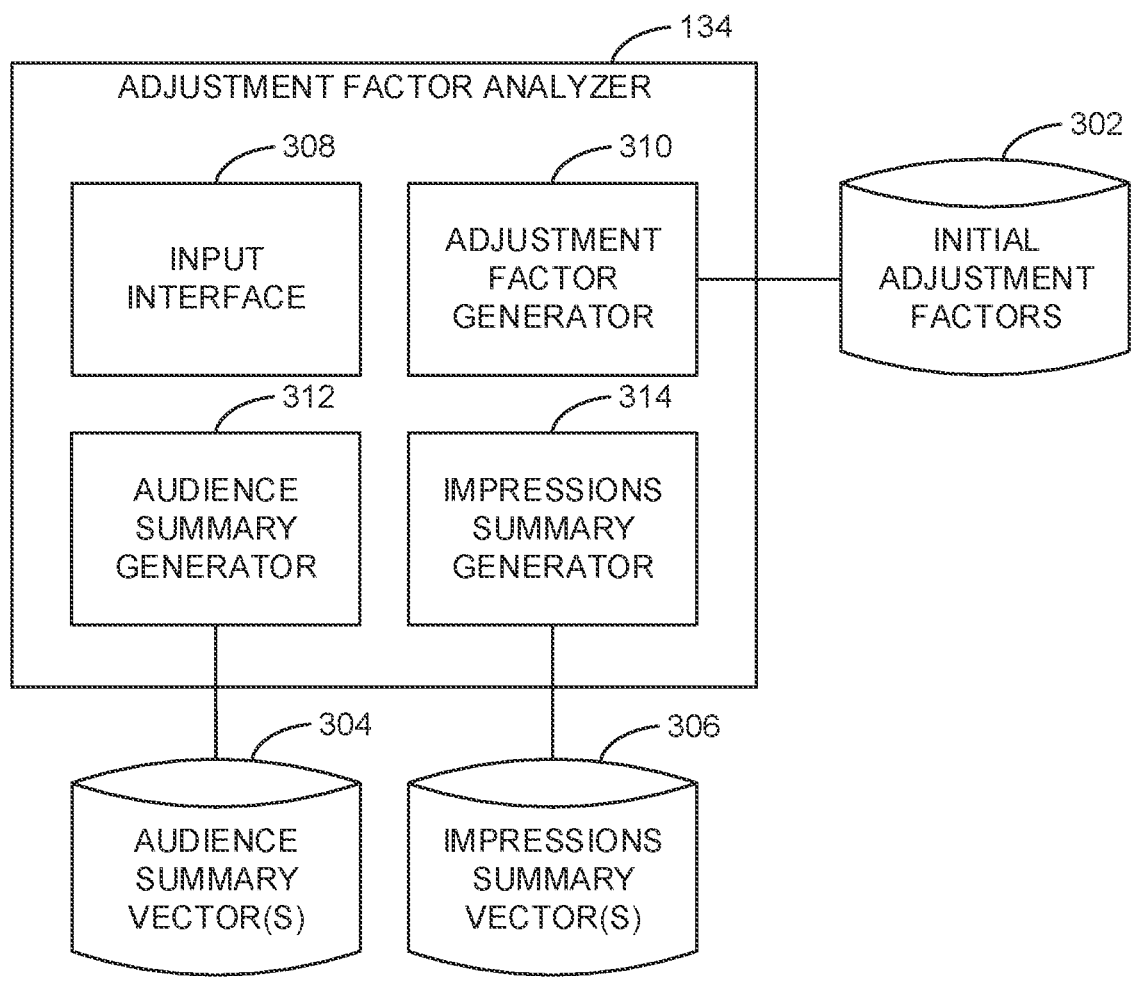
FIG. 3 is a block diagram of the example adjustment factor analyzer of FIG. 1 configured to generate example initial adjustment factors for misattribution and/or non-coverage, example audience summary vectors, and example impressions summary vectors.

FIG. 3 is a block diagram of the example adjustment factor analyzer 134 of FIG. 1. In some examples, the adjustment factor analyzer 134 generates example initial adjustment factors 302 for misattribution and/or non-coverage, example audience summary vectors 304, and/or example impressions summary vectors 306. In the illustrated example of FIG. 3, the adjustment factor analyzer 134 includes an example input interface 308, an example adjustment factor generator 310, an example audience summary generator 312, and an example impressions summary generator 314.

The example input interface 308 receives and/or otherwise obtains input data from the AME privacy-protected data store 132 of FIG. 1. For example, the input interface 308 obtains the AME intermediary merged data stored in the AME intermediary merged data database 130 of FIG. 1 including panel data collected by the AME 104 and database proprietor impressions data collected by the database proprietor 102.

The example adjustment factor generator 310 determines the initial adjustment factors 302 based on the AME intermediary merged data in the AME intermediary merged data database 130. In some examples, the initial adjustment factors 302 are calculated to correct audience metrics (e.g., audience size, non-coverage, misattribution, etc.) that correspond to a particular demographic (e.g., demographic group), device type (e.g., desktop computer versus mobile device), and/or geographic region (e.g., country). Stated differently, in some examples, the adjustment factor generator 310 generates different initial adjustment factors 302 for each demographic, device type, and region combination. Furthermore, the initial adjustment factors 302 include at least one of a initial misattribution adjustment factor or a initial non-coverage adjustment factor for each combination. For example, the initial misattribution adjustment factors are used to correct for misattribution of impressions, in which an impression is logged for a registered user of the database proprietor 102 instead of the actual person exposed to the media. The initial non-coverage adjustment factors are used to correct for non-coverage of impressions that occur when the registered user is signed out of the database proprietor 102. The example adjustment factor generator 310 may generate the initial misattribution adjustment factors and/or the initial non-coverage adjustment factors in any suitable manner presently known or subsequently developed. In some examples, the adjustment factor generator 310 provides the initial adjustment factors 302 to the factor imputation controller 151 of FIG. 1 to impute missing, incomplete, and/or otherwise insufficient data based on the initial adjustment factors 302. Additionally or alternatively, the adjustment factor generator 310 provides the initial adjustment factors 302 to the adjustment factors database 136 from which the factor imputation controller 151 may access the initial adjustment factors 302. In some examples, the initial misattribution adjustment factors are provided within one or more misattribution adjustment matrices, and the initial non-coverage adjustment factors are provided within one or more non-coverage adjustment vectors.

The example audience summary generator 312 generates the audience summary vectors 304 based on the AME intermediary merged data in the AME intermediary merged data database 130. In some examples, each of the audience summary vectors 304 includes values indicating a count of total number of AME panelists associated with each demographic represented in corresponding ones of the misattribution adjustment matrices and/or corresponding ones of the non-coverage adjustment vectors. Thus, in some examples, a size of a given audience summary vector corresponds to a number of different demographics in the associated misattribution adjustment matrix and/or non-coverage adjustment vector. For example, for a given misattribution adjustment matrix and/or a given non-coverage adjustment vector corresponding to three demographics (e.g., males aged 2-12, males aged 13-17, and males aged 18-20), the corresponding audience summary vector is a 3-element vector, where each element in the audience summary vector identifies a number of unique individuals (e.g., panelists) in the corresponding demographic. In particular, in such an example, the audience summary vector includes a first audience count in the first element corresponding to the first demographic (e.g., males aged 2-12), a second audience count in the second element corresponding to the second demographic (e.g., males aged 13-17), and a third audience count in the third element corresponding to the third demographic (e.g., males aged 18-20). In some examples, the unique panelists represented in the audience counts corresponding to a given non-coverage adjustment vector include those panelists for which at least one impression has been logged (e.g., whether signed in or signed out of the database proprietor 102). In other examples, because misattribution adjustment factors are only applied to signed-in impressions, the unique panelists represented in the audience count for a particular demographic correspond to signed-in users of the database proprietor 102. In some examples, the audience summary generator 312 provides the audience summary vectors 304 to the factor imputation controller 151 for determining whether imputation factors are to be generated for one or more demographic groups of the initial adjustment factors 302. Additionally or alternatively, the audience summary generator 312 provides the audience summary vectors 304 to the adjustment factors database 136 from which the factor imputation controller 151 may access the audience summary vectors 304.

The example impressions summary generator 314 generates the impressions summary vectors 306 based on the AME intermediary merged data stored in the AME intermediary merged data database 130. In some examples, each of the impressions summary vectors 306 includes values indicating a total count of impressions associated with the audience members represented in a corresponding audience summary vector 304 that, as noted above, correspond to a particular one of the misattribution adjustment matrices and/or a particular one of the non-coverage adjustment vectors. Thus, in some examples, a size of a given impressions summary vector is the same size as a corresponding audience summary vector 304, which corresponds to the number of different demographics in the associated misattribution adjustment matrix and/or non-coverage adjustment vector. For example, for a given misattribution adjustment matrix and/or a given non-coverage adjustment vector corresponding to the three demographics (e.g., males aged 2-12, males aged 13-17, and males aged 18-20), the corresponding impressions summary vector identifies the impressions counts corresponding to the three demographics. In particular, in such an example, the impressions summary vector includes a first impressions count in the first element corresponding to the first demographic (e.g., males aged 2-12), a second impressions count in the second element corresponding to the second demographic (e.g., males aged 13-17), and a third impressions count in the third element corresponding to the third demographic (e.g., males aged 18-20). In some examples, the impressions counts represent impressions logged for panelists in the corresponding demographics. In some examples, the impressions summary generator 314 provides the impressions summary vectors 306 to the factor imputation controller 151 for determining whether imputation factors are to be generated for one or more demographic groups of the initial adjustment factors 302.

While an example manner of implementing the adjustment factor analyzer 134 of FIG. 1 is illustrated in FIG. 3, one or more of the elements, processes and/or devices illustrated in FIG. 3 may be combined, divided, re-arranged, omitted, eliminated and/or implemented in any other way. Further, the example input interface 308, the example adjustment factor generator 310, the example audience summary generator 312, the example impressions summary generator 314 and/or, more generally, the example adjustment factor analyzer 134 of FIG. 3 may be implemented by hardware, software, firmware and/or any combination of hardware, software and/or firmware. Thus, for example, any of the example input interface 308, the example adjustment factor generator 310, the example audience summary generator 312, the example impressions summary generator 314 and/or, more generally, the example adjustment factor analyzer 134 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input interface 308, the example adjustment factor generator 310, the example audience summary generator 312, and/or the example impressions summary generator 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adjustment factor analyzer 134 of FIG. 1 may include one or more elements, processes and/or devices in addition to, or instead of, those illustrated in FIG. 3, and/or may include more than one of any or all of the illustrated elements, processes and devices.

Figure 4:
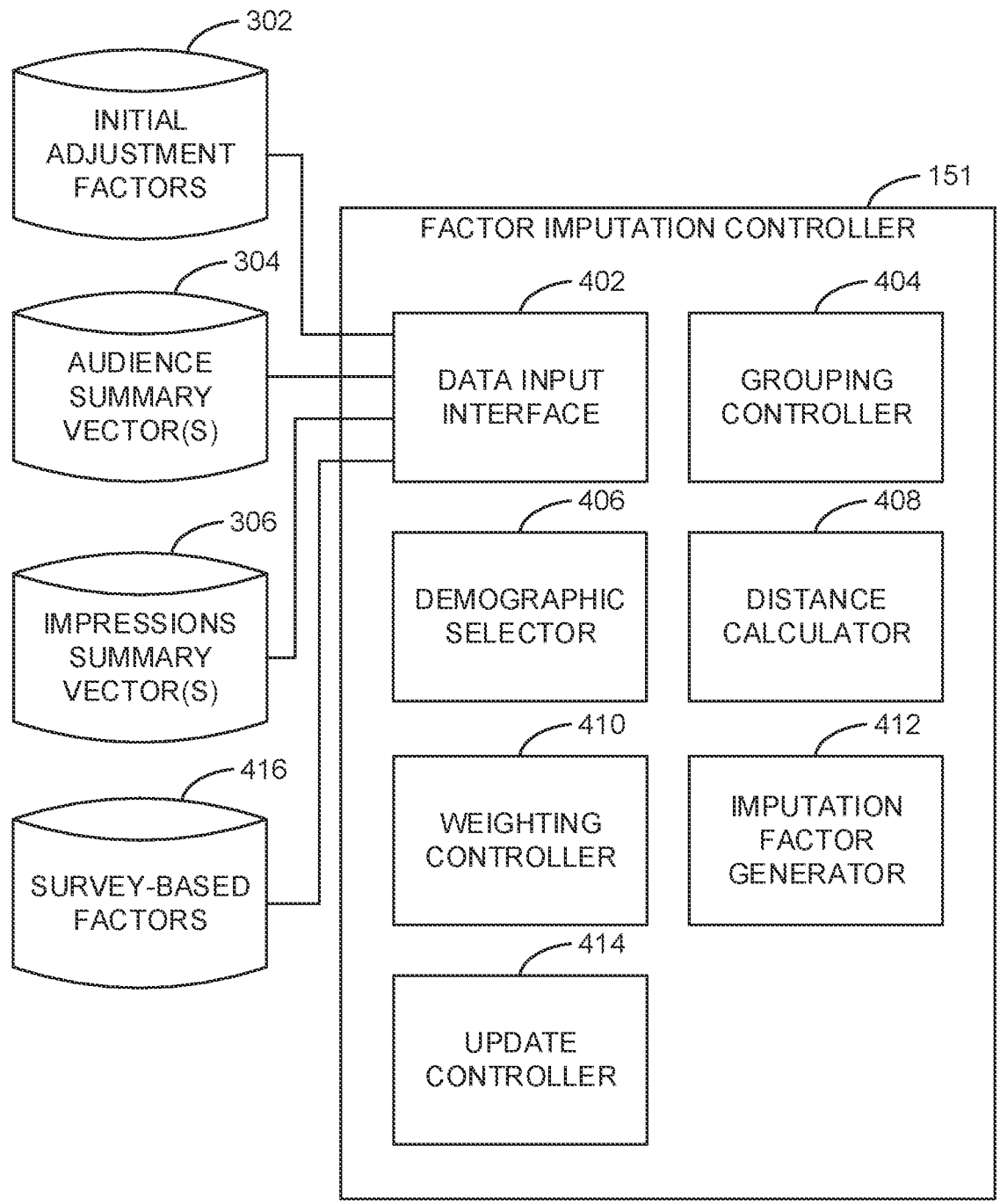
FIG. 4 is a block diagram of the example factor imputation controller of FIG. 1 configured to calculate imputation factors.

FIG. 4 is a block diagram of the example factor imputation controller 151 of FIG. 1. The factor imputation controller 151 generates imputation factors to replace one or more of the initial adjustment factors 302 when privacy constraints limit and/or otherwise restrict data that can be extracted from the privacy-protected cloud environment 106. In some examples, the factor imputation controller 151 generates the imputation factors when one or more additional sample size criteria (e.g., a number of unique panelists, a number of impressions, etc.) of the data in the privacy-protected cloud environment 106 are not satisfied. The factor imputation controller 151 determines whether adjustment factors are to be imputed for one or more demographic groups, and calculates imputation factors based on the initial adjustment factors 302. In the illustrated example of FIG. 4, the factor imputation controller 151 includes an example data input interface 402, an example grouping controller 404, an example demographic selector 406, an example distance calculator 408, an example weighting controller 410, an example imputation factor generator 412, and an example update controller 414.

The example data input interface 402 receives and/or otherwise obtains input data from the adjustment factor analyzer 134. For example, the data input interface 402 obtains the initial adjustment factors 302, the audience summary vectors 304, and the impressions summary vectors 306. In some examples, the data input interface 402 receives and/or obtains such input data from the adjustment factor analyzer 134 indirectly by accessing such data in the adjustment factors database 136. In some examples, the data input interface 402 additionally receives example survey-based factors 416 from the adjustment factor analyzer 134. In some examples, the survey-based factors 416 are provided to the data input interface 402 independent of the adjustment factor analyzer 134 (e.g., directly via the AME panel data database 122). The survey-based factors 416 are adjustment factors (e.g., misattribution and/or non-coverage adjustment factors) calculated based on surveys administered by the audience measurement entity 104 of FIG. 1. In some examples, the survey-based factors 416 are determined for each combination of demographic and device type. In some such examples, the survey-based factors 416 are associated with a first set of geographic regions different from a second set of geographic regions of the initial adjustment factors 302.

The grouping controller 404 selects and/or otherwise groups the initial adjustment factors 302 based on the audience summary vectors 304 and the impressions summary vectors 306. For example, the grouping controller 404 determines whether each set of the initial adjustment factors 302 corresponding to a particular geographic region (e.g., country) is a donor factor set of donor adjustment factors or a recipient factor set of recipient adjustment factors. As used herein, a donor factor set is a set of the initial adjustment factors 302 (e.g., a set of donor adjustment factors) that is used to impute adjustment factors for one or more demographics in a recipient factor set of recipient adjustment factors. As used herein, a recipient factor set is a set of the initial adjustment factors 302 (e.g., a set of recipient adjustment factors) for which adjustment factors are to be imputed. Stated differently, the recipient factor set includes adjustment factors calculated based on missing and/or incomplete information for one or more demographics that need to be adjusted and/or corrected to account for the missing and/or incomplete data. Corrections to the initial adjustment factors for a recipient set can be imputed based on one or more donor factor sets of adjustment factors. In some examples, the grouping controller 404 makes the determination for each set of the initial adjustment factors 302 (e.g., whether a donor factor set or a recipient factor set) by comparing the audience summary vectors 304 to an audience threshold and comparing the impressions summary vectors 306 to an impressions threshold. In this example, the audience threshold corresponds to a threshold number of audience members (e.g., panelists) to produce a desired accuracy level for the initial adjustment factors 302. That is, the audience threshold corresponds to a sample size of audience member panelists that is sufficient large to provide statistically robust audience metrics. Similarly, the impressions threshold corresponds to a threshold number of impressions (e.g., a suitable sample size of impressions) to produce the desired accuracy level for the initial adjustment factors 302. The audience threshold and the impressions threshold may be the same as one another or different and corresponding to any suitable value (e.g., 25, 30, 50, 100, etc.). In some examples, different audience and/or impressions thresholds can be used for each different combination of geographic region, device type, and/or demographic. In other examples, the audience and impressions thresholds are the same for some or all of the different combinations of geographic region, device type, and demographic. In some examples, the audience measurement entity 104 selects the audience and impressions thresholds during initialization of the factor imputation controller 151. In some such examples, the audience and/or impressions thresholds can be modified (e.g., periodically) by the audience measurement entity 104.

In this example, for a given geographic region, the grouping controller 404 compares each audience count in the corresponding audience summary vector 304 to the audience threshold, and compares each impressions count in the corresponding impressions summary vector 306 to the impressions threshold. In response to at least one of the audience counts not satisfying the audience threshold (e.g., being less than the audience threshold), the grouping controller 404 identifies the set of initial adjustment factors 302 corresponding to the given geographic region as a recipient factor set. Similarly, in response to at least one of the impressions counts not satisfying the impressions threshold (e.g., being less than the impressions threshold), the grouping controller 404 identifies the set of initial adjustment factors 302 corresponding to the given geographic region as a recipient factor set. That is, even if some initial adjustment factors 302 for particular demographics and particular device types in the given geographic region satisfy the audience and impressions thresholds, such initial adjustment factors 302 are still designated as recipient factors when a different initial adjustment factor (e.g., for a different demographic and/or different device type) for the given geographic region does not satisfy at least one of the audience threshold or the impressions threshold. Alternatively, in response to each of the audience counts satisfying the audience threshold (e.g., being at or above the audience threshold) and each of the impressions counts satisfying the impressions threshold (e.g., being at or above the impressions threshold), the grouping controller 404 identifies the set of initial adjustment factors 302 corresponding to the given geographic region as a donor factor set. In some examples, the grouping controller 404 performs the above identification for each set of the initial adjustment factors 302 corresponding to each combination of demographic, device type, and geographic region. While the initial adjustment factors 302 are associated with geographic regions in examples disclosed herein, the initial adjustment factors 302 can be defined based on one or more different metrics (e.g., device type, demographic, media type, etc.) in other examples.

Tables 1, 2, and 3 below illustrate example values of the initial adjustment factors 302 for a first country (e.g., a first geographic region), a second country (e.g., a second geographic region), and a third country (e.g., a third geographic region), respectively. In this example, the first country corresponds to Japan (JP), the second country corresponds to the United States (US), and the third country corresponds to Italy (IT). Furthermore, in this example, a first demographic corresponds to females aged 18 to 20, a second demographic corresponds to females aged 21 to 24, a third demographic corresponds to females aged 25 to 29, and a fourth demographic corresponds to females aged 30 to 34. In other examples, one or more different demographics may be used instead. In this example, there is no division of the data among different device types. However, in other examples, separate initial adjustment factors 302 may be generated for the above-noted demographics across separate device types. In this example, the initial adjustment factors 302 are misattribution adjustment factors indicating a probability that, for each logged impression, the database proprietor 102 logs a demographic corresponding to column i (e.g., corresponding to one of the demographic buckets) given that the actual demographic for the logged impression corresponds to row j (e.g., a different one of the demographic buckets). For example, based on the first row of the below Table 1, for an impression associated with the first actual demographic (e.g., females aged 18 to 30), a probability that the database proprietor 102 correctly reports the first logged demographic (F: 18-20) for the impression is 0.8, and a probability that the database proprietor 102 incorrectly reports the second logged demographic (F: 21-24) for the impression is 0.15.

TABLE 1

JP Initial Misattribution Adjustment Factors

Country = JP
Actual

| Demographic | Logged Demographic | | | |
|---|---|---|---|---|
|  | F:18-20 | F:21-24 | F:25-29 | F:30-34 |
| F:18-20 | 0.8 | 0.15 | 0.025 | 0.025 |
| F:21-24 | 0.1 | 0.75 | 0.05 | 0.1 |
| F:25-29 | 0.01 | 0.01 | 0.96 | 0.02 |
| F:30-34 | 0.1 | 0.025 | 0.025 | 0.85 |

TABLE 2

US Initial Misattribution Adjustment Factors

Country = US
Actual

| Demographic | Logged Demographic | | | |
|---|---|---|---|---|
|  | F:18-20 | F:21-24 | F:25-29 | F:30-34 |
| F:18-20 | 0.75 | 0.05 | 0.1 | 0.1 |
| F:21-24 | 0.05 | 0.8 | 0.1 | 0.05 |
| F:25-29 | 0.05 | 0.2 | 0.65 | 0.1 |
| F:30-34 | 0.025 | 0.025 | 0.05 | 0.9 |

TABLE 3

IT Initial Misattribution Adjustment Factors

Country = IT
Actual

| Demographic | Logged Demographic | | | |
|---|---|---|---|---|
|  | F:18-20 | F:21-24 | F:25-29 | F:30-34 |
| F:18-20 | 0.9 | 0.035 | 0.03 | 0.035 |
| F:21-24 | 0.25 | 0.5 | 0.1 | 0.15 |

TABLE 3-continued

IT Initial Misattribution Adjustment Factors

Country = IT

| Actual Demographic | Logged Demographic | | | |
|---|---|---|---|---|
| | F:18-20 | F:21-24 | F:25-29 | F:30-34 |
| F:25-29 | 0.1 | 0.05 | 0.8 | 0.05 |
| F:30-34 | 0.025 | 0.025 | 0.1 | 0.85 |

Tables 4, 5, and 6 below illustrate example values of the audience summary vectors 304 corresponding to the initial adjustment factors 302 of Tables 1, 2, and 3, respectively. More particularly, the values in the second (e.g., middle) column of Tables 4, 5, and 6 correspond to the values of the audience summary vector 304 for each geographic region (e.g., JP, US, IT). Furthermore, Tables 7, 8, and 9 below illustrate example values of the impressions summary vectors 306 corresponding to the initial adjustment factors 302 of Tables 1, 2, and 3, respectively. More particularly, the values in the second (e.g., middle) column of Tables 7, 8, and 9 correspond to the values of the impressions summary vector 306 for each geographic region (e.g., JP, US, IT).

In this example, the audience threshold is 10, and the impressions threshold is 300. In other examples, a different audience threshold and/or a different impressions threshold may be used instead. In this example, the grouping controller 404 compares each audience count in the audience summary vectors 304 to the audience threshold. The grouping controller 404 determines whether each audience count in the second columns of Tables 4, 5, and 6 satisfies the audience threshold, and results of the determination are shown in the third columns of Tables 4, 5, and 6. Similarly, the grouping controller 404 compares each impressions count in the impressions summary vectors 306 to the impressions threshold. The grouping controller 404 determines whether each impressions count in the second columns of Tables 7, 8, and 9 satisfies the impressions threshold, and results of the determination are shown in the third columns of Tables 7, 8, and 9.

TABLE 4

JP Audience Summary Vector and Resulting Threshold Comparison
Country = JP

| True demographic | Audience (panelists) | Meets audience threshold? |
|---|---|---|
| F: 18-20 | 100 | YES |
| F: 21-24 | 50 | YES |
| F: 25-29 | 3 | NO |
| F: 30-34 | 15 | YES |

TABLE 5

US Audience Summary Vector and Resulting Threshold Comparison
Country = US

| True demographic | Audience (panelists) | Meets audience threshold? |
|---|---|---|
| F: 18-20 | 1,000 | YES |
| F: 21-24 | 250 | YES |
| F: 25-29 | 900 | YES |
| F: 30-34 | 100 | YES |

TABLE 6

IT Audience Summary Vector and Resulting Threshold Comparison
Country = IT

| True demographic | Audience (panelists) | Meets audience threshold? |
|---|---|---|
| F: 18-20 | 400 | YES |
| F: 21-24 | 180 | YES |
| F: 25-29 | 600 | YES |
| F: 30-34 | 250 | YES |

TABLE 7

JP Impressions Summary Vector and Resulting Threshold Comparison
Country = JP

| True demographic | Impressions | Meets impressions threshold? |
|---|---|---|
| F: 18-20 | 450 | YES |
| F: 21-24 | 80 | NO |
| F: 25-29 | 30 | NO |
| F: 30-34 | 350 | YES |

TABLE 8

US Impressions Summary Vector and Resulting Threshold Comparison
Country = US

| True demographic | Impressions | Meets impressions threshold? |
|---|---|---|
| F: 18-20 | 2,500 | YES |
| F: 21-24 | 600 | YES |
| F: 25-29 | 1,250 | YES |
| F: 30-34 | 450 | YES |

TABLE 9

IT Impressions Summary Vector and Resulting Threshold Comparison
Country = IT

| True demographic | Impressions | Meets impressions threshold? |
|---|---|---|
| F: 18-20 | 1,800 | YES |
| F: 21-24 | 550 | YES |
| F: 25-29 | 750 | YES |
| F: 30-34 | 500 | YES |

In some examples, the grouping controller 404 identifies donor and recipient factor sets based on the results in the third columns of Tables 4 through 9. For example, in response to at least one of the audience counts or the impressions counts for a given country not satisfying the audience or impressions threshold, respectively, the grouping controller 404 selects the initial adjustment factors 302 of the given country as a recipient factor set of recipient adjustment factors. In this example, based on Table 4 and the audience threshold of 10, the grouping controller 404 determines that at least one of the audience counts (e.g., the audience count corresponding to the F:25-29 demographic) in the JP audience summary vector is below the audience threshold. Similarly, based on Table 7 and the impressions threshold of 300, the grouping controller 404 determines that at least one of the impressions counts (e.g., the impressions count corresponding to both the F:21-24 and the F:25-29 demographics) in the JP impressions summary vector is below the impressions threshold. As such, the grouping controller 404 selects the initial adjustment factors 302 corresponding to JP (e.g., as shown in Table 1) as a recipient factor set of recipient adjustment factors. In this example, both the JP audience summary vector and the JP impressions summary vector do not satisfy the corresponding thresholds. In other examples, the grouping controller 404 selects the initial adjustment factors 302 corresponding to JP (e.g., as shown in Table 1 above) as a recipient factor set in response to only one of the JP audience summary vector or the JP impressions summary vector including a value that does not satisfy the corresponding threshold.

Furthermore, based on Tables 5 and 6 and the audience threshold of 10, the grouping controller 404 determines that each of the audience counts in the US audience summary vector and the IT audience summary vector satisfies the audience threshold (e.g., is at or above the audience threshold). Similarly, based on Tables 8 and 9 and the impressions threshold of 300, the grouping controller 404 determines that each of the impressions counts in the US impressions summary vector and the IT audience summary vector satisfies the impressions threshold (e.g., is at or above the impressions threshold). As such, the grouping controller 404 selects the initial adjustment factors 302 corresponding to US (e.g., as shown in Table 2) and the initial adjustment factors 302 corresponding to IT (e.g., as shown in Table 3) as donor adjustment factors.

The example demographic selector 406 selects the particular ones of the initial adjustment factors 302 designated as a recipient factor set to be modified and/or replaced by imputing values from the corresponding ones of the initial adjustment factors 302 designated as donor adjustment factors. For example, the demographic selector 406 selects one or more demographics from the recipient factor set that do not satisfy the audience threshold and/or the impressions threshold. In this example, the recipient adjustment factors correspond to the JP initial adjustment factors of Table 1 above. Based on the JP audience summary vector of Table 4, the demographic selector 406 determines that the third demographic group (e.g., corresponding to females aged 25 to 29) does not satisfy the audience threshold. Furthermore, based on the JP impressions summary vector of Table 7 above, the demographic selector 406 determines that the second demographic group (e.g., corresponding to females aged 21 to 24) and the third demographic group do not satisfy the impressions threshold. Accordingly, in this example, the demographic selector 406 selects both the second and third demographic groups for JP as the particular initial adjustment factors 302 to be modified and/or replaced by imputing values from the other initial adjustment factors 302 (e.g., from the US and/or IT).

In some examples, the demographic selector 406 generates reduced adjustment factor sets by removing the selected demographic groups from the both the particular initial adjustment factors 302 designated as recipient adjustment factors and also from the other initial adjustment factors 302 designated as donor adjustment factors. For example, the demographic selector 406 generates a JP reduced factor set, a US reduced factor set, and an IT reduced factor set shown below in example Tables 10, 11, and 12, respectively. In this example, the JP reduced factor set, the US reduced factor set, and the IT reduced factor set include the initial adjustment factors 302 corresponding to the first demographic group (e.g., females aged 18 to 20) and the fourth demographic group (e.g., females aged 30 to 34) from Tables 1, 2, and 3, respectively.

TABLE 10

JP Reduced Adjustment Factor Set
Country = JP

| Actual Demographic | Logged Demographic | |
|---|---|---|
| | F: 18-20 | F: 30-34 |
| F: 18-20 | 0.8 | 0.025 |
| F: 30-34 | 0.1 | 0.85 |

TABLE 11

US Reduced Adjustment Factor Set
Country = US

| Actual Demographic | Logged Demographic | |
|---|---|---|
| | F: 18-20 | F: 30-34 |
| F: 18-20 | 0.75 | 0.1 |
| F: 30-34 | 0.025 | 0.9 |

TABLE 12

IT Reduced Adjustment Factor Set
Country = IT

| Actual Demographic | Logged Demographic | |
|---|---|---|
| | F: 18-20 | F: 30-34 |
| F: 18-20 | 0.9 | 0.035 |
| F: 30-34 | 0.025 | 0.85 |

The distance calculator 408 calculates distances or differences between the recipient factor set and the donor factor sets as represented in the reduced adjustment factor sets. For example, the distance calculator 408 calculates a first distance between the JP reduced adjustment factor set of Table 10 and the US reduced adjustment factor set of Table 11, and calculates a second distance between the JP reduced factor set of Table 10 and the IT reduced adjustment factor set of Table 12. In this example, when the initial adjustment factors 302 are misattribution adjustment factors, the initial adjustment factors 302 are in matrix form. In some such examples, the distance calculator 408 calculates the distance as a Euclidean distance between the reduced factor sets. For example, to calculate the first distance, the distance calculator 408 calculates squared differences between corresponding elements of the US and JP reduced adjustment factor sets, then calculates a square root of a sum of the squared differences. Similarly, to calculate the second distance, the distance calculator 408 calculates squared differences between corresponding elements of the IT and JP reduced adjustment factor sets, then calculates a square root of a sum of the squared differences. Example calculations for the first distance (e.g., between the JP and US reduced adjustment factor sets represented in Tables 10 and 11) is shown below in Equation 1.

$$\sqrt{\begin{aligned}(0.75-0.8)^2+(0.1-0.025)^2+\\(0.025-0.1)^2+(0.9-0.85)^2\end{aligned}}=1.216 \quad \text{[Equation 1]}$$

Example calculations for the second distance (e.g., between the JP and IT reduced adjustment factor sets represented in Tables 10 and 12) is shown below in Equation 2:

$$\sqrt{\begin{aligned}(0.9-0.8)^2+(0.035-0.025)^2+\\(0.025-0.1)^2+(0.85-0.85)^2\end{aligned}}=1.416 \quad \text{Equation 2}$$

In other examples, the distance between the factor sets may be calculated in any other suitable manner.

Example Table 13 below tabulates the values for the example calculated first and second distances in the second column. In some examples, the distance calculator 408 determines a smallest distance (e.g., minimum distance) between the recipient factor set and the different donor factor sets. In this example, the distance calculator 408 determines that the smallest distance is the first distance (e.g., 1.216). Furthermore, the distance calculator 408 determines a ratio of each calculated distance to the smallest distance. For example, the distance calculator 408 determines a first ratio by dividing the smallest distance by the first distance (e.g., 1.216/1.216), and determines a second ratio by dividing the smallest distance by the second distance (e.g., 1.216/1.416). The calculated ratios for US and IT of this example are shown in the third column of Table 13.

TABLE 13

Distance Between Donor and Recipient Factor Sets

| Country | Distance | Ratio to smallest distance | Retain country? |
| --- | --- | --- | --- |
| US | 1.216 | 1.000 | YES |
| IT | 1.416 | 0.9 | YES |
| Minimum | 1.216 | | |

In some examples, the distance calculator 408 determines whether to retain each of the donor factor sets based on the calculated ratios between the smallest distance and each calculated distance (e.g., represented in the third column of Table 13 in this example). In some examples, only the retained donor factor sets are used for calculating imputation factors for the recipient factor set. In particular, those donor factor sets which are closest (e.g., within a retention threshold) to the recipient factor set are used for calculating the imputation factors. In this example, the retention threshold is 0.9, and the distance calculator 408 determines whether each of the calculated ratios in the third column of Table 13 satisfies the retention threshold. In this example, results of the determination are shown in the example fourth column of Table 13. In this example, both the US and IT factor sets satisfy the retention threshold and, as such, both the US and IT factor sets are retained. In other examples, a different retention threshold may be used instead. In some examples, a portion (e.g., a fixed number, all, etc.) of the donor factor sets are retained regardless of the calculated ratios.

The weighting controller 410 generates weights for the retained donor factor sets based on the calculated distances. For example, the weighting controller 410 calculates a reciprocal distance for each of the donor factor sets, and determines the weights by dividing each or the reciprocal distances by a sum of the reciprocal distances. In this example, the weighting controller 410 determines a first reciprocal distance corresponding to US by dividing 1 by the first distance (e.g., 1/1.216), and determines a second reciprocal distance corresponding to IT by dividing 1 by the second distance (e.g., 1/1.416). The calculated reciprocal distances are shown in the second column of example Table 14 below. Furthermore, the weighting controller 410 determines a sum of the reciprocal distances (e.g., 0.822+0.706=1.528). In this example, the weighting controller 410 determines a first weight for the US factor set by dividing the first reciprocal distance by the sum of the reciprocal distances (e.g., 0.822/1.528=0.538), and determines a second weight for the IT factor set by dividing the second reciprocal distance by the sum of the reciprocal distances (e.g., 0.706/1.528=0.462). As such, the calculated weight for each donor factor set is inversely correlated to the distance between the donor factor set and the recipient factor set. Stated differently, the generated weights are greater for donor factor sets having a smaller distance, and the generated weights are smaller for donor factor sets having a larger distance. Example calculated weights for this example are shown in the fourth column of Table 14.

TABLE 14

Weights for Donor Factor Sets

| Country | Distance | 1/Distance | Weight |
| --- | --- | --- | --- |
| US | 1.216 | 0.822 | 0.538 |
| IT | 1.416 | 0.706 | 0.462 |
| Sum | | 1.528 | |

In this example, the weighting controller 410 weights the donor factor sets based on the calculated weights from Table 14. For example, the weighting controller 410 selects ones of the US initial adjustment factors 302 of Table 2 that correspond to the demographic groups not satisfying at least one of the audience threshold or the impressions threshold (e.g., the second and third demographics in this example), and multiplies the selected US initial adjustment factors by the corresponding US weight (e.g., 0.538) from Table 14. Similarly, the weighting controller 410 selects ones of the IT initial adjustment factors 302 of Table 3 that correspond to the demographic groups not satisfying at least one of the audience threshold or the impressions threshold (e.g., the second and third demographics in this example), and multiplies the selected IT initial adjustment factors by the corresponding IT weight (e.g., 0.462) from Table 14. Example weighted donor factor sets for US and IT are shown below in Tables 15 and 16, respectively.

TABLE 15

US Weighted Adjustment Factor Set
Country = US

| Actual Demographic | Logged Demographic | | | |
| --- | --- | --- | --- | --- |
| | F: 18-20 | F: 21-24 | F: 25-29 | F: 30-34 |
| F: 21-24 | 0.0269 | 0.4303 | 0.0538 | 0.0269 |
| F: 25-29 | 0.0269 | 0.1076 | 0.3496 | 0.0538 |

TABLE 16

IT Weighted Adjustment Factor Set
Country = IT

| Actual Demographic | Logged Demographic | | | |
|---|---|---|---|---|
| | F: 18-20 | F: 21-24 | F: 25-29 | F: 30-34 |
| F: 21-24 | 0.1155 | 0.2310 | 0.0462 | 0.0693 |
| F: 25-29 | 0.0462 | 0.0231 | 0.3697 | 0.0231 |

The weighting controller 410 calculates an aggregate donor factor set based on the weighted donor factor sets. For example, the weighting controller 410 sums the weighted US adjustment factors of Table 15 above and the corresponding weighted IT adjustment factors of Table 16 above to determine the aggregate donor factor set of Table 17 below.

TABLE 17

Aggregate Donor Factor Set

| Actual Demographic | Logged Demographic | | | |
|---|---|---|---|---|
| | F: 18-20 | F: 21-24 | F: 25-29 | F: 30-34 |
| F: 21-24 | 0.1424 | 0.6614 | 0.1 | 0.0962 |
| F: 25-29 | 0.0731 | 0.1307 | 0.7193 | 0.0769 |

In some examples, the weighting controller 410 determines a recipient weight, where the recipient weight corresponds to a contribution of particular ones of the initial adjustment factors 302 in the recipient factor set to the imputation factors. For example, although the audience and impressions counts for the second and third demographics (e.g., females aged 21-24 and females aged 25-29) in the initial adjustment factors 302 of Table 1 do not meet the audience and/or impressions thresholds, the recipient initial adjustment factors 302 may be used in the calculation of the imputation factors. In some examples, the recipient weight is selected upon initialization of the factor imputation controller 151. In some examples, the recipient weight may be modified by user input. In some examples, the recipient weight is set to zero and the recipient initial adjustment factors 302 do not contribute to the imputed factors. Stated differently, when the recipient weight is set to zero, the imputation factors are composed only of donor factors.

In this example, the recipient weight is 0.1. In other examples, a different recipient weight can be used instead. In this example, the weighting controller 410 weights the recipient factor set and re-weights the aggregate donor factor set based on the recipient weight. For example, the weighting controller 410 selects ones of the JP initial adjustment factors 302 of Table 1 above that correspond to the demographic groups not satisfying at least one of the audience or impressions thresholds, and multiplies the selected JP initial adjustment factors 302 by the recipient weight. Furthermore, the weighting controller 410 multiples the aggregate donor factors of Table 17 by 1 minus the recipient weight (e.g., 1-0.1=0.9). The weighted recipient factors and the re-weighted aggregate donor factors are shown below in example Tables 18 and 19, respectively.

TABLE 18

Weighted Recipient Adjustment Factors
Country = JP

| Actual Demographic | Logged Demographic | | | |
|---|---|---|---|---|
| | F: 18-20 | F: 21-24 | F: 25-29 | F: 30-34 |
| F: 21-24 | 0.01 | 0.075 | 0.005 | 0.01 |
| F: 25-29 | 0.001 | 0.001 | 0.096 | 0.002 |

TABLE 19

Re-weighted Aggregate Donor Adjustment Factors

| Actual demographic | Logged Demographic | | | |
|---|---|---|---|---|
| | F: 18-20 | F: 21-24 | F: 25-29 | F: 30-34 |
| F: 21-24 | 0.1282 | 0.5952 | 0.09 | 0.0866 |
| F: 25-29 | 0.0658 | 0.1176 | 0.6474 | 0.0692 |

The example imputation factor generator 412 generates the imputation factors corresponding to the demographics that did not satisfy the audience and/or impressions thresholds. For example, the imputation factors are used to adjust or correct the JP initial adjustment factors for the second and third demographics that did not satisfy the audience and/or impressions thresholds. In this example, the imputation factor generator 412 combines (e.g., sums) the weighted recipient factors of Table 18 and the re-weighted aggregate donor factors of Table 19 to determine the imputation factors shown in Table 20 below.

TABLE 20

Imputed Adjustment Factors

| True demographic | Logged Demographic | | | |
|---|---|---|---|---|
| | F: 18-20 | F: 21-24 | F: 25-29 | F: 30-34 |
| F: 21-24 | 0.1382 | 0.6702 | 0.095 | 0.0966 |
| F: 25-29 | 0.0668 | 0.1187 | 0.7434 | 0.0712 |

In some examples, the imputation factor generator 412 merges and/or otherwise combines the imputation factors with non-imputed adjustment factors (e.g., the original initial adjustment factors 302) for the recipient factor set. For example, the imputation factor generator 412 collates the imputation factors of Table 20 (e.g., corresponding to the second and third demographics) with non-imputed recipient factors from Table 1 above (e.g., corresponding to the first and fourth demographics). In this example, the merged imputation and non-imputed recipient factors correspond to updated JP adjustment factors as shown in example Table 21 below.

TABLE 21

Updated JP Adjustment Factors
Country = JP

| Actual demographic | Logged Demographic | | | |
|---|---|---|---|---|
| | F: 18-20 | F: 21-24 | F: 25-29 | F: 30-34 |
| F: 18-20 | 0.8 | 0.15 | 0.025 | 0.025 |
| F: 21-24 | 0.1381 | 0.6702 | 0.095 | 0.0966 |

TABLE 21-continued

Updated JP Adjustment Factors
Country = JP

| Actual demographic | Logged Demographic | | | |
|---|---|---|---|---|
| | F: 18-20 | F: 21-24 | F: 25-29 | F: 30-34 |
| F: 25-29 | 0.0668 | 0.1186 | 0.7434 | 0.0712 |
| F: 30-34 | 0.1 | 0.025 | 0.025 | 0.85 |

In some examples, the update controller 414 provides the updated JP adjustment factors from Table 21 to the adjustment factors database 136 in the AME output data warehouse 138 of FIG. 1. In some examples, the audience metrics analyzer 154 of FIG. 1 uses the updated JP adjustment factors to correct misattribution of impressions in the aggregated campaign data 150 of FIG. 1. In some examples, the update controller 414 determines whether to generate new imputed adjustment factors for at least one of the recipient factor sets of the initial adjustment factors 302. For example, the update controller 414 determines that new imputed adjustment factors are to be determined for the JP adjustment factor set in response to the factor imputation controller 151 receiving and/or otherwise accessing new initial adjustment factors via the data input interface 402. In such an example, the update controller 414 causes the factor imputation controller 151 to generate new imputed adjustment factors for the JP adjustment factor set. In some examples, the update controller 414 causes the factor imputation controller 151 to generate imputed adjustment factors for each recipient factor set identified by the grouping controller 404.

The example Tables 1 to 21 above illustrate an example process for imputation of misattribution adjustment factors. However, in other examples, the data may be represented, stored, and/or processed in formats and/or data structures other than the example tables described above. Further, in some examples, the factor imputation controller 151 executes a similar process for imputation of non-coverage adjustment factors. For example, such non-coverage adjustment factors can be used by the audience metrics analyzer 154 of FIG. 1 to correct for non-coverage of impressions in the aggregated campaign data stored in the aggregated campaign data database 150. While the misattribution adjustment factors of the above example are provided in matrix form (e.g., the Tables 1, 2, and 3 have multiple rows of data and multiple columns of data), non-coverage adjustment factors include a single value for each demographic and, therefore, are provided in vector form. Specifically, the non-coverage adjustment factor for each particular demographic is representative of a multiplier applied to the audience count of audience members matched by the database proprietor 102 to a particular user account (due to the audience members being signed into their respective user accounts) to arrive at a total audience size estimate that includes audience members that could not be matched to a particular registered user of the database proprietor 102. As such, for non-coverage adjustment factors, the distance calculator 408 calculates distances between factor sets using a cosine similarity instead of a Euclidean distance. However, other methodologies to determine the distances between factor sets may also be implemented. Aside from the different approaches to calculating the distances between the factor sets, the example process executed by the grouping controller 404, the demographic selector 406, the weighting controller 410, and the imputation factor generator 412 is substantially the same for imputation of misattribution and non-coverage adjustment factors. In one example, example non-coverage adjustment factors (e.g., initial adjustment factors 302) for JP, US, and IT are shown below in example Tables 22, 23, and 24, respectively.

TABLE 22

Initial JP Non-Coverage Adjustment Factors
Country = JP

| Actual demographic | Non-coverage factor |
|---|---|
| F: 18-20 | 1.25 |
| F: 21-24 | 2.15 |
| F: 25-29 | 3 |
| F: 30-34 | 1.1 |

TABLE 23

Initial US Non-Coverage Adjustment Factors
Country = US

| Actual demographic | Non-coverage factor |
|---|---|
| F: 18-20 | 1.1 |
| F: 21-24 | 1.5 |
| F: 25-29 | 2.75 |
| F: 30-34 | 1.15 |

TABLE 24

Initial IT Non-Coverage Adjustment Factors
Country = IT

| Actual demographic | Non-coverage factor |
|---|---|
| F: 18-20 | 3 |
| F: 21-24 | 2.1 |
| F: 25-29 | 1.4 |
| F: 30-34 | 2.2 |

In this example, the audience summary vectors 304 and the impressions summary vectors 306 for the JP, US, and IT factor sets are the same as those shown in Tables 4 to 9 above. As such, the grouping controller 404 determines that the initial JP non-coverage factors of Table 22 above are recipient factors, and the initial US and IT non-coverage factors of Tables 23 and 24 are donor factors. Furthermore, the demographic selector 406 generates the reduced recipient and donor factor sets of example Tables 25, 26, and 27 below by removing the second and third demographic groups (e.g., females aged 21-24 and females aged 25-29) that do not meet the audience and/or impressions thresholds.

TABLE 25

JP Reduced Non-Coverage Adjustment Factor Set
Country = JP

| Actual demographic | Non-coverage factor |
|---|---|
| F: 18-20 | 1.25 |
| F: 30-34 | 1.1 |

TABLE 26

US Reduced Non-Coverage Adjustment Factor Set
Country = US

| Actual demographic | Non-coverage factor |
|---|---|
| F: 18-20 | 1.1 |
| F: 30-34 | 1.15 |

TABLE 27

IT Reduced Non-Coverage Adjustment Factor Set
Country = IT

| Actual demographic | Non-coverage factor |
|---|---|
| F: 18-20 | 3 |
| F: 30-34 | 2.2 |

In this example, the distance calculator 408 calculates distances between the recipient factor set and each of the donor factor sets. For example, the distance calculator 408 calculates the first distance between the JP reduced adjustment factor set of Table 25 and the US reduced adjustment factor set of Table 26, and calculates a second distance between the JP reduced factor set of Table 25 and the IT reduced adjustment factor set of Table 27. In this example, when the initial adjustment factors 302 are non-coverage adjustment factors, the initial adjustment factors 302 are in vector form. As such, in this example, the distance calculator 408 calculates the cosine similarity between the reduced factor sets. For example, to calculate the first distance, the distance calculator 408 calculates a dot product of the JP reduced adjustment factors (e.g., A) and the US reduced adjustment factors (e.g., B), then divides the dot product by the magnitudes of the JP reduced adjustment factors (e.g., ∥A∥) and the US reduced adjustment factors (e.g., ∥B∥), and subtracts the result from 1. Similarly, to calculate the second distance, the distance calculator 408 calculates a dot product of the JP reduced adjustment factors (e.g., A) and the IT reduced adjustment factors (e.g., C), then divides the dot product by the magnitudes of the JP reduced adjustment factors (e.g., ∥A∥) and the IT reduced adjustment factors (e.g., ∥C∥), and subtracts the result from 1. Example calculations for the first distance (e.g., between the JP and US reduced adjustment factor sets represented in Tables 25 and 26) is shown below in Equation 3:

$$1 - \frac{A \cdot B}{\|A\|\|B\|} = 1 - \frac{(1.25)(1.1) + (1.1)(1.15)}{\sqrt{1.25^2 + 1.1^2}\sqrt{1.1^2 + 1.15^2}} = 0.00369 \quad \text{Equation 3}$$

Example calculations for the second distance (e.g., between the JP and IT reduced adjustment factor sets represented in Tables 25 and 27) is shown below in Equation 2:

$$1 - \frac{A \cdot C}{\|A\|\|C\|} = 1 - \frac{(1.25)(3) + (1.1)(2.2)}{\sqrt{1.25^2 + 1.1^2}\sqrt{3^2 + 2.2^2}} = 0.00395 \quad \text{Equation 4}$$

Example Table 28 below tabulates the values for the example calculated first and second distances in the second column. In some examples, the distance calculator 408 determines a smallest distance (e.g., minimum distance) between the recipient factor set and the different donor factor sets. In this example, the distance calculator 408 determines that the smallest distance is the first distance (e.g., 0.00369). Furthermore, the distance calculator 408 determines a ratio of each calculated distance to the smallest distance. For example, the distance calculator 408 determines a first ratio by dividing the smallest distance by the first distance (e.g., 0.00369/0.00369), and determines a second ratio by dividing the smallest distance by the second distance (e.g., 0.00369/0.00395). The calculated ratios for US and IT of this example are shown in the third column of Table 28. In this example, both the US and IT factor sets satisfy the retention threshold of 0.9 and, as such, both the US and IT factor sets are retained when calculating the imputation factors for the recipient factor set (e.g., the JP adjustment factors in this example).

TABLE 28

Distance Between Donor and Recipient Factor Sets

| Country | Distance | Ratio to smallest distance | Retain country? |
|---|---|---|---|
| US | 0.00369 | 1.000 | YES |
| IT | 0.00395 | 0.935 | YES |
| Minimum | 0.00369 | | |

The weighting controller 410 generates weights for the retained donor factor sets based on the calculated distances. In this example, the weighting controller 410 determines a first reciprocal distance corresponding to US by dividing 1 by the first distance (e.g., 1/0.00369), and determines a second reciprocal distance corresponding to IT by dividing 1 by the second distance (e.g., 1/0.00395). The calculated reciprocal distances are shown in the second column of example Table 29 below. Furthermore, the weighting controller 410 determines a sum of the reciprocal distances (e.g., 270.823+253.194=524.017). In this example, the weighting controller 410 determines a first weight for the US factor set by dividing the first reciprocal distance by the sum of the reciprocal distances (e.g., 270.823/524.017=0.5168), and determines a second weight for the IT factor set by dividing the second reciprocal distance by the sum of the reciprocal distances (e.g., 253.194/524.017=0.4832). Example calculated weights for this example are shown in the fourth column of Table 29.

TABLE 29

Weights for Donor Factor Sets

| Country | Distance | 1/Distance | Weight |
|---|---|---|---|
| US | 0.00369 | 270.823 | 0.5168 |
| IT | 0.00395 | 253.194 | 0.4832 |
| Sum | | 524.017 | |

In this example, the weighting controller 410 weights the donor factor sets based on the calculated weights from Table 29. The resulting weighted donor factor sets for US and IT in this example are shown below in Tables 30 and 31, respectively. Furthermore, the weighting controller 410 determines aggregate donor factors based on the weighted donor factor sets, and the aggregate donor factors are shown in example Table 32 below.

TABLE 30

US Weighted Reduced Adjustment Factor Set
Country = US

| Actual demographic | Non-coverage factor |
|---|---|
| F: 18-20 | 0.7752 |
| F: 30-34 | 1.4213 |

TABLE 31

IT Weighted Reduced Adjustment Factor Set
Country = IT

| Actual demographic | Non-coverage factor |
|---|---|
| F: 18-20 | 1.0147 |
| F: 30-34 | 0.6765 |

TABLE 32

Aggregate Donor Adjustment Factors

| Actual demographic | Non-coverage factor |
|---|---|
| F: 18-20 | 1.7899 |
| F: 30-34 | 2.0977 |

In some examples, the weighting controller 410 weights the recipient factor set based on a recipient weight, and re-weights the aggregate donor factors of Table 32 by the recipient weight. In this example, the recipient weight is zero (e.g., the recipient factors do not contribute to the imputed adjustment factors). As such, the aggregate donor factors of Table 32 correspond to the imputed adjustment factors that are to be used to correct or replace the JP initial adjustment factors for the second and third demographics that did not satisfy the audience and/or impressions thresholds.

In this example, the imputation factor generator 412 merges and/or otherwise combines the imputed adjustment factors with non-imputed adjustment factors (e.g., the original initial adjustment factors 302) for the recipient factor set. For example, the imputation factor generator 412 collates the imputed recipient factors of Table 32 (e.g., corresponding to the second and third demographics) with non-imputed recipient factors from Table 22 (e.g., corresponding to the first and fourth demographics). In this example, the merged imputed and non-imputed recipient factors correspond to updated adjustment factors for JP as shown in example Table 33 below.

TABLE 33

Updated JP Non-Coverage Adjustment Factors
Country = JP

| Actual demographic | Non-coverage factor |
|---|---|
| F: 18-20 | 1.25 |
| F: 21-24 | 1.7899 |
| F: 25-29 | 2.0977 |
| F: 30-34 | 1.1 |

In some examples, the update controller 414 provides the updated JP non-coverage adjustment factors from Table 33 to the adjustment factors database 136 in the AME output data warehouse 138 of FIG. 1. In some examples, the audience metrics analyzer 154 of FIG. 1 uses the updated JP non-coverage adjustment factors to correct for non-coverage of impressions in the aggregated campaign data 150 of FIG. 1.

While an example manner of implementing the factor imputation controller 151 of FIG. 1 is illustrated in FIG. 4, one or more of the elements, processes and/or devices illustrated in FIG. 4 may be combined, divided, re-arranged, omitted, eliminated and/or implemented in any other way. Further, the example data input interface 402, the example grouping controller 404, the example demographic selector 406, the example distance calculator 408, the example weighting controller 410, the example imputation factor generator 412, the example update controller 414, and/or, more generally, the example factor imputation controller 151 FIG. 4 may be implemented by hardware, software, firmware and/or any combination of hardware, software and/or firmware. Thus, for example, any of the example data input interface 402, the example grouping controller 404, the example demographic selector 406, the example distance calculator 408, the example weighting controller 410, the example imputation factor generator 412, the example update controller 414, and/or, more generally, the example factor imputation controller 151 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data input interface 402, the example grouping controller 404, the example demographic selector 406, the example distance calculator 408, the example weighting controller 410, the example imputation factor generator 412, the example update controller 414, and/or the example factor imputation controller 151 is/are hereby expressly defined to include a non-transitory computer readable storage device or storage disk such as a memory, a digital versatile disk (DVD), a compact disk (CD), a Blu-ray disk, etc. including the software and/or firmware. Further still, the example factor imputation controller 151 of FIG. 4 may include one or more elements, processes and/or devices in addition to, or instead of, those illustrated in FIG. 4, and/or may include more than one of any or all of the illustrated elements, processes and devices.

Figure 5:
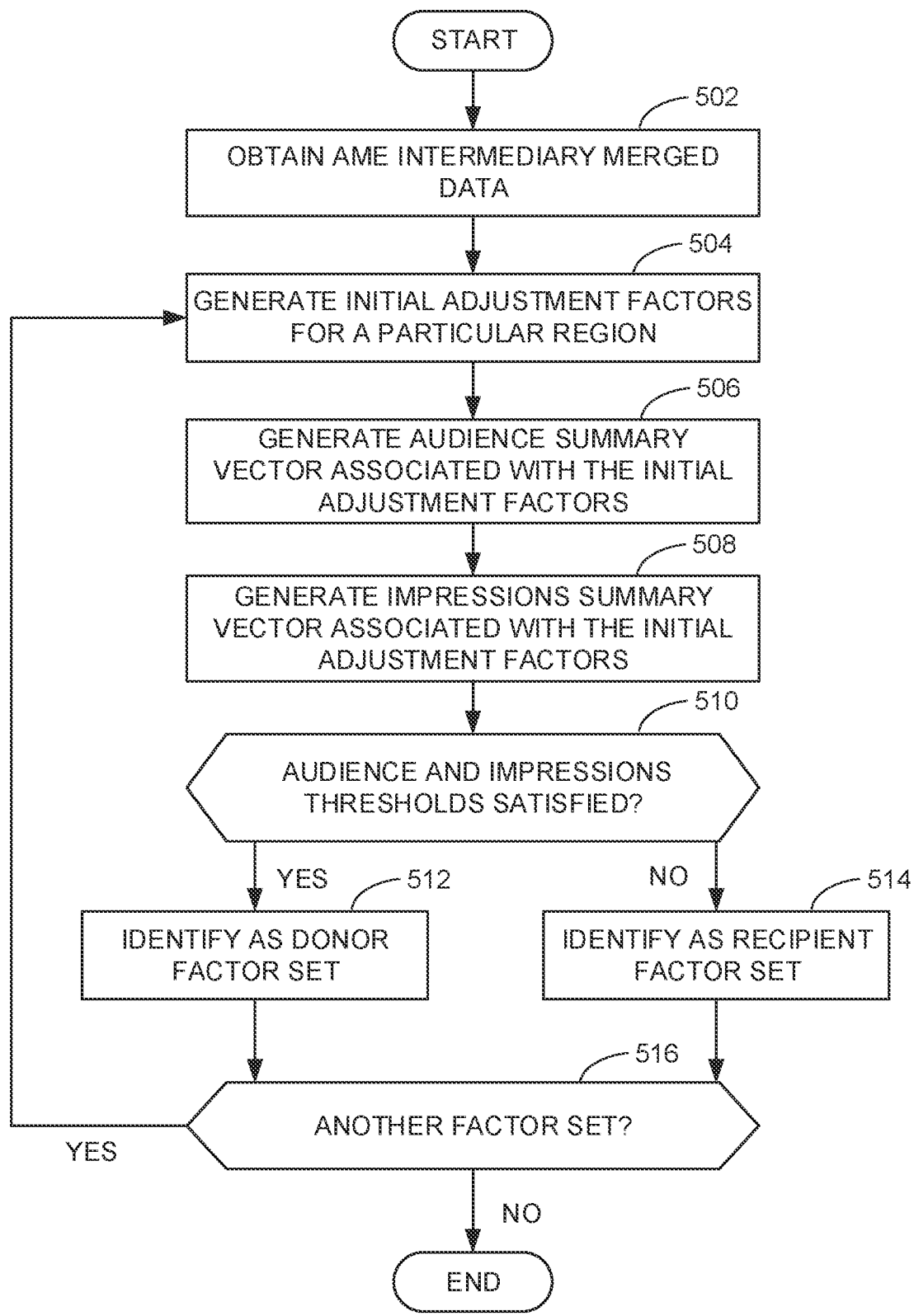
FIG. 5 is a flowchart representative of machine readable instructions which may be executed to implement the example adjustment factor analyzer of FIG. 3 and/or the example factor imputation controller of FIG. 4 to select and/or otherwise identify donor and recipient factor sets.

Flowcharts representative of example hardware logic, machine readable instructions, hardware implemented state machines, and/or any combination thereof for implementing aspects of the privacy-protected cloud environment 106 of FIG. 1 are shown in FIGS. 5 and/or 6. The machine readable instructions may be one or more executable programs or portion(s) of an executable program for execution by a computer processor and/or processor circuitry, such as the processor 712 shown in the example processor platform 700 discussed below in connection with FIG. 7, and/or the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 712 and/or the processor 812, but the entire program and/or parts thereof could alternatively be executed by a device other than the processor 712 and/or the processor 812 and/or embodied in firmware or dedicated hardware. Further, although the example program is described with reference to the flowcharts illustrated in FIGS. 5 and/or 6, many other methods of implementing the example privacy-protected cloud environment 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" item, as used herein, refers to one or more of that item. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 which may be executed to implement the example adjustment factor analyzer 134 of FIG. 3 and/or the example factor imputation controller 151 of FIG. 4 to select and/or otherwise identify donor and recipient factor sets. The example instructions 500 of FIG. 5 begin at block 502, at which the example adjustment factor analyzer 134 obtains AME intermediary merged data. For example, the example input interface 308 of FIG. 3 receives and/or otherwise obtains the AME intermediary merged data from the AME intermediary merged data database 130 in the AME privacy-protected data store 132 of FIG. 1, the AME intermediary merged data 130 including panel data collected by the AME 104 and database proprietor impressions data collected by the database proprietor 102 of FIG. 1.

At block 504, the example adjustment factor analyzer 134 generates the initial adjustment factors 302 of FIG. 3 for a particular region. For example, the example adjustment factor generator 310 of FIG. 3 determines the initial adjustment factors 302 based on the AME intermediary merged data. In some examples, the initial adjustment factors 302 correspond to one or more particular combinations of demographics, and/or device types in the particular region of interest. In some examples, the initial adjustment factors 302 include at least one of initial misattribution adjustment factors or initial non-coverage adjustment factors for the particular combination. In some examples, the initial adjustment factors 302 correspond to at least one of the adjustment factor sets in Tables 1, 2, 3, 22, 23, or 24 above. The initial adjustment factors 302 are an initial or preliminary estimate of adjustment factors for misattribution and/or non-coverage based on the raw data stored in the AME intermediate merged data database 130. These initial adjustment factors are merely initial or preliminary estimates because they can be unreliable in that they may be based on groupings (e.g., particular combinations of demographic, device type, and/or region) of audience members and/or associated impressions that are two small to provide statistically significant sample sizes. This problem specifically arises in the context of the data as stored in the AME intermediate merged data database 130 because of privacy constraints imposed on the extraction of data from the privacy-protected cloud environment 106. In other words, the particular way in which data is collected, merged, stored, and extracted create technological limitations (premised on interests in privacy) on the ability of the example adjustment factor analyzer 134 to generate reliable and/or accurate adjustment factors that can, in turn, be used to produce reliable and/or accurate audience metrics. The remainder of the process of FIG. 5 serves to identify when particular initial adjustment factors are incomplete or otherwise inadequate while the process of FIG. 6 sets forth how these initial or preliminary initial adjustment factors are adjusted or corrected to overcome the technical limitations on the available data to provide more accurate adjustment factors that are used to produce more accurate audience metrics.

At block 506, the example adjustment factor analyzer 134 generates the audience summary vector 304 associated with the initial adjustment factors for the particular region. For example, the example audience summary generator 312 of FIG. 3 determines the audience summary vector 304 based on the AME intermediary merged data, where the audience summary vector 304 includes values corresponding to each particular demographic, device type, and region combination. More particularly, in some examples, the values in the audience summary vector 304 correspond to the number of unique panelists (e.g., audience size) and/or devices used in the calculation of each of the initial adjustment factors 302 (e.g., for each combination of demographic, device type, and/or region). In some examples, the audience summary vector 304 corresponds to at least one of the audience summary vectors shown in Tables 4, 5, or 6 above.

At block 508, the example adjustment factor analyzer 134 generates the impressions summary vector 306 associated with the initial adjustment factors for the particular region. For example, the example impressions summary generator 314 of FIG. 3 determines the impressions summary vector 306 based on the AME intermediary merged data, where the impressions summary vector 306 includes values corresponding to each particular demographic, device type, and region combination. More particularly, in some examples, the values in the impressions summary vector 306 corresponding to the number of impressions used in the calculation of each of the initial adjustment factors 302 (e.g., for each combination of demographic, device type, and/or region). In some examples, the impressions summary vector 306 corresponds to at least one of the impressions summary vectors shown in Tables 7, 8, or 9 above.

At block 510, the example factor imputation controller 151 determines whether the initial adjustment factors 302 satisfy an audience threshold and an impressions threshold. For example, the example grouping controller 404 of FIG. 4 compares each audience count in the audience summary vector 304 to the audience threshold, and compares each impressions count in the impressions summary vector 306 to the impressions threshold. In response to the grouping controller 404 determining that each audience count in the audience summary vector 304 satisfies the audience threshold and determining that each impressions count in the impressions summary vector 306 satisfies the impressions threshold (e.g., block 510 returns a result of YES), control proceeds to block 512. Alternatively, in response to the grouping controller 404 determining that at least one audience count in the audience summary vector 304 does not satisfy the audience threshold and/or determining that at least one impressions count in the impressions summary vector 306 does not satisfy the impressions threshold (e.g., block 510 returns a result of NO), control proceeds to block 514.

At block 512, the example factor imputation controller 151 identifies the initial adjustment factors 302 corresponding to the particular region as a donor factor set. As described above, a donor factor set is a set of initial adjustment factors that are sufficiently complete and/or reliably to be used as the basis (e.g., as a surrogate) for imputing factors for an incomplete and/or unreliable set of initial adjustment factors. For example, the grouping controller 404 selects the US adjustment factors of Table 2 above and/or the IT adjustment factors of Table 3 above as the donor factor set.

At block 514, the example factor imputation controller 151 identifies the initial adjustment factors 302 corresponding to the particular region as a recipient factor set. As described above, a recipient factor set is a set of initial adjustment factors that are incomplete and/or otherwise unreliable such that the factors need to be adjusted and/or corrected through imputation of one or more donor factor set. For example, the grouping controller 404 selects the JP adjustment factors of Table 1 above as a recipient factor set.

At block 516, the example factor imputation controller 151 determines whether another factor set is to be analyzed and/or classified. For example, the grouping controller 404 determines whether another factor set associated with a different region is to be identified as a recipient factor set or a donor factor set. In response to the grouping controller 404 determining that another factor set is to be identified (e.g., block 516 returns a result of YES), control returns to block 504. Alternatively, in response to the grouping controller 404 determining that there is no other factor set to be identified (e.g., all of the initial adjustment factors 302 have been identified as recipient or donor factor sets) (e.g., block 516 returns a result of NO), the process ends.

Figure 6:
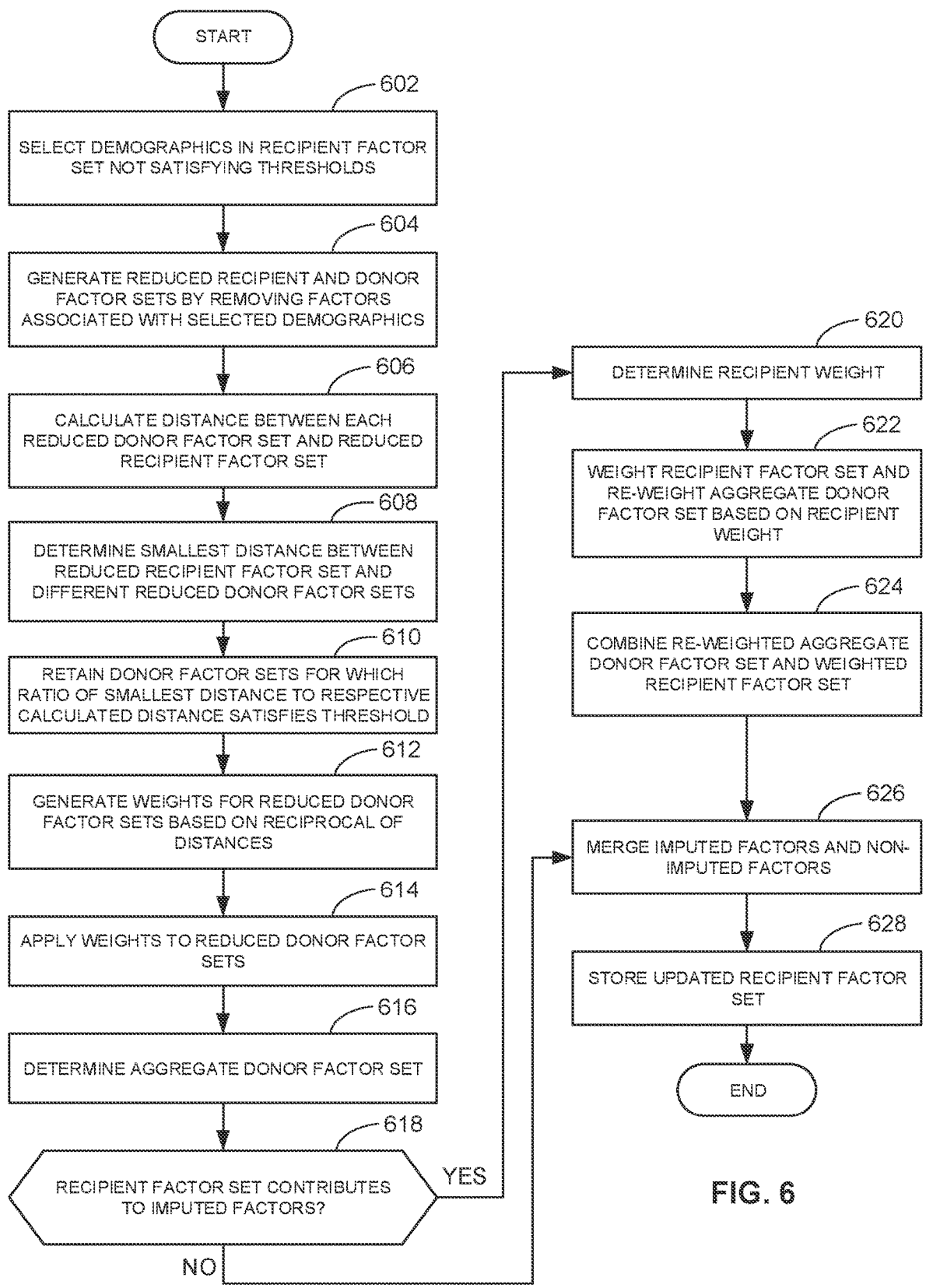
FIG. 6 is a flowchart representative of machine readable instructions which may be executed to implement the example factor imputation controller of FIG. 4 to calculate imputation factors for a recipient factor set.

FIG. 6 is a flowchart representative of example machine readable instructions 600 which may be executed to implement the example factor imputation controller 151 of FIG. 4 to calculate imputed factors for a recipient factor set. In some examples, the factor imputation controller 151 executes the instructions 600 for each of the recipient factor sets identified at block 514 of FIG. 5. The instructions 600 of FIG. 6 begin at block 602, at which the example factor imputation controller 151 selects one or more demographics in the recipient factor set that do not satisfy the audience and/or impressions thresholds. For example, the example demographic selector 406 of FIG. 4 selects the demographics corresponding to each audience count in the example audience summary vector 304 that does not satisfy the audience threshold, and/or corresponding to each impressions count in the example impressions summary vector 306 that does not satisfy the impressions threshold. In one example, the recipient factor set is the JP adjustment factor set of Table 1 above, and the demographic selector 406 selects the second and third demographics (e.g., females aged 21-24 and females aged 25-29) based on Tables 4 and 7 above.

At block 604, the example factor imputation controller 151 generates reduced recipient and donor factor sets by removing the factors associated with the selected demographics from the recipient and donor factor sets. In other words, the example factor imputation controller 151 isolates the initial adjustment factors for the particular demographics that satisfy both the audience and impressions thresholds. For example, the example demographic selector 406 generates the JP reduced adjustment factor set of Table 10 above, the US reduced adjustment factor set of Table 11 above, and the IT reduced adjustment factor set of Table 12 above by removing the selected demographics (e.g., the second and third demographics) from the JP adjustment factor set, the US adjustment factor set, and the IT adjustment factor set of Tables 1, 2, and 3, respectively.

At block 606, the example factor imputation controller 151 calculates a distance between each reduced donor factor set and the reduced recipient factor set. For example, the example distance calculator 408 of FIG. 4 calculates a first distance between the JP reduced adjustment factor set of Table 10 above and the US reduced adjustment factor set of Table 11 above, and calculates a second distance between the JP reduced adjustment factor set of Table 10 and the IT reduced adjustment factor set of Table 12 above. In some examples, each of the first and second distances correspond to a Euclidean distance between associated misattribution factors and/or correspond to a cosine similarity between associated non-coverage factors.

At block 608, the example factor imputation controller 151 determines a smallest distance between the reduced recipient factor set and the different reduced donor factor sets. For example, the example distance calculator 408 selects the smallest distance from the first and second calculated differences from Table 13 above.

At block 610, the example factor imputation controller 151 retains the donor factor sets for which a ratio of the smallest distance to the respective calculated distance satisfies a threshold. For example, the example distance calculator 408 determines a first ratio corresponding to the first donor factor set by dividing the smallest distance by the first distance, and determines a second ratio corresponding to the second donor factor set by dividing the smallest distance by the second distance. The example distance calculator 408 compares the first and second ratios to an example retention threshold (e.g., 0.9), and retains the donor factor sets satisfying the retention threshold. In some examples, donor factor sets which are not retained (e.g., do not satisfy the retention threshold) are not used in calculation of the imputed factors.

At block 612, the example factor imputation controller 151 generates weights for the retained donor factor sets based on the reciprocal of the distances. For example, the example weighting controller 410 of FIG. 4 calculates a reciprocal distance for each of the retained donor factor sets (e.g., as shown in the third column of Table 14 above), and determines the weights (e.g., as shown in the fourth column of Table 14 above) by dividing each of the reciprocal distances by a sum of the reciprocal distances.

At block 614, the example factor imputation controller 151 applies the weights to the donor factor sets. For example, the example weighting controller 410 selects donor adjustment factors from the donor factor sets corresponding to the selected demographics (e.g., the demographics not satisfying at least one of the audience threshold or the impressions threshold). The example weighting controller 410 multiplies each of the selected donor adjustment factors by the corresponding weight (e.g., from Table 14 above) to generate weighted donor factor sets (e.g., shown in Tables 15 and 16 above).

At block 616, the example factor imputation controller 151 determines an aggregate donor factor set. For example, the example weighting controller 410 sums the weighted donor factor sets to generate the aggregate donor factor set (e.g., as shown in Table 18 above).

At block 618, the example factor imputation controller 151 determines whether the recipient factor set contributes to the imputed factors. For example, the example weighting controller 410 determines whether a recipient threshold is non-zero, where a non-zero recipient threshold indicates that the recipient factor set contributes to the imputed factors. In response to the weighting controller 410 determining that the recipient factor set contributes to the imputed factors (e.g., block 618 returns a result of YES), control proceeds to block 620. Alternatively, in response to the weighting controller 410 determining that the recipient factor set does not contribute to the imputed factors (e.g., block 618 returns a result of NO), control proceeds to block 626.

At block 620, the example factor imputation controller 151 determines the recipient weight. For example, the example weighting controller 410 determines the recipient weight based on a user input.

At block 622, the example factor imputation controller 151 weights the recipient factor set and re-weights the aggregate donor factor set based on the recipient weight. For example, the example weighting controller 410 generates a weighted recipient factor set by multiplying each of the recipient factors corresponding to the selected demographics by the recipient weight (e.g., 0.1), and generates a re-weighted aggregate donor factor set by multiplying each of the aggregate donor factors by 1 minus the recipient weight (e.g., 1-0.1=0.9). In one example, the weighting controller 410 generates the weighted recipient factor set of Table 19 above and generates the re-weighted aggregate donor factor set of Table 20 above.

At block 624, the example factor imputation controller 151 combines the re-weighted aggregate donor factor set and the weighted recipient factor set. For example, the example imputation factor generator 412 of FIG. 4 sums the re-weighted aggregate donor factor set (e.g., shown in Table 20 above) and the weighted recipient factor set (e.g., shown in Table 19 above) to generate the imputed factors.

At block 626, the example factor imputation controller 151 merges the imputed factors with non-imputed factors from the recipient factor set. In this example, the non-imputed factors correspond to the factors that were not removed from the recipient factor set at block 604. For example, the example imputation factor generator 412 merges and/or collates the imputed factors (e.g., corresponding to the second and third demographics) with the non-imputed factors (e.g., corresponding to the first and fourth demographics) from the recipient factor set to generate an updated recipient factor set. In some examples, the imputed factors correspond to the combined re-weighted aggregate donor factor set and weighted recipient factor set generated at block 624. In other examples (e.g., when the recipient weight is zero), the imputed factors correspond to the aggregate donor factor set generated at block 616.

At block 628, the example factor imputation controller 151 causes storage of the updated recipient factor set. For example, the example update controller 414 of FIG. 4 provides the updated recipient factor set to the AME output data warehouse 138 of FIG. 1, such that the audience metrics analyzer 154 of FIG. 1 uses the updated recipient factor set to correct errors in the aggregated campaign data 150 of FIG. 1 caused by misattribution and/or non-coverage of audience members and/or associated media impressions.

Figure 7:
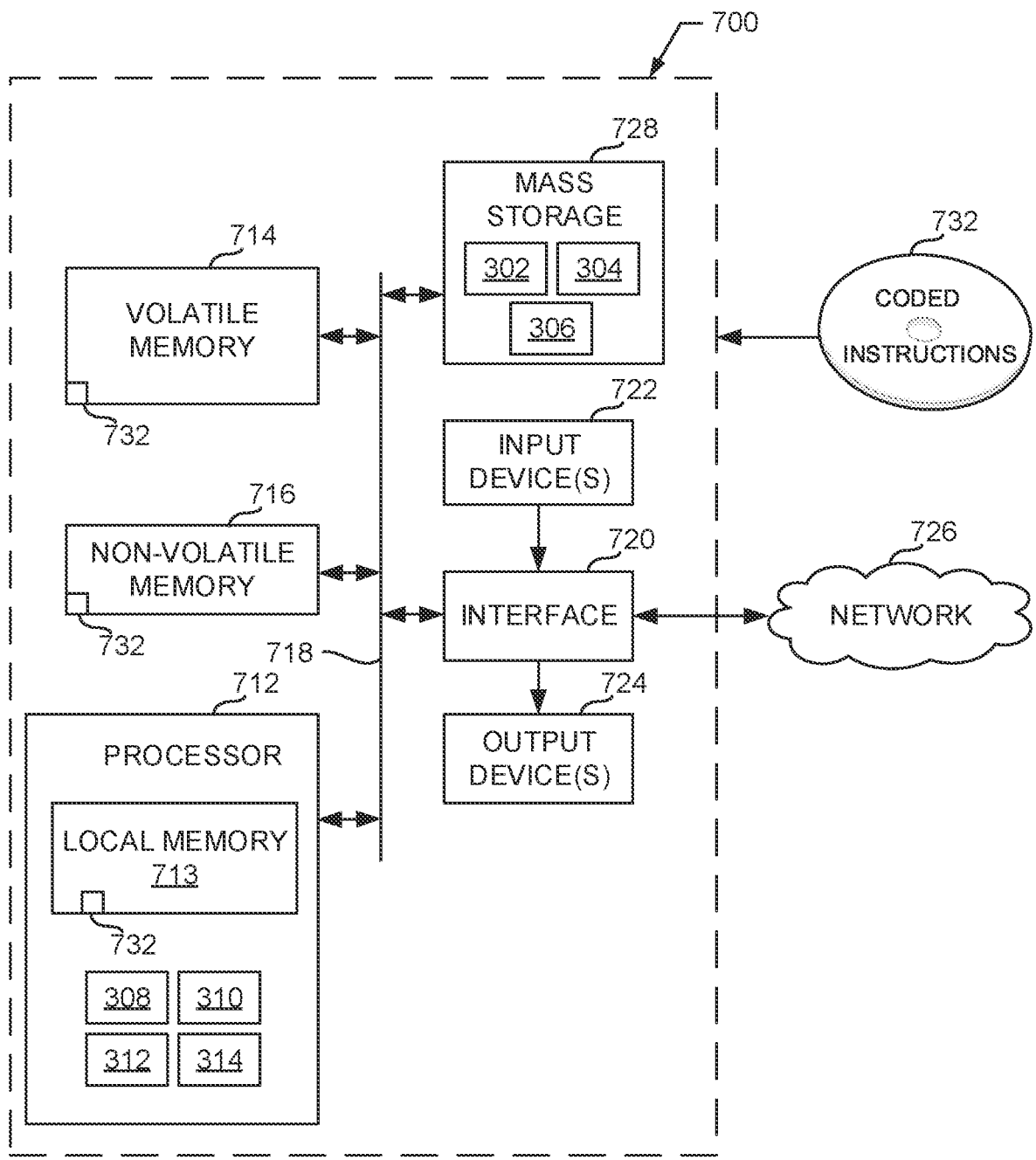
FIG. 7 is a block diagram of an example processing platform structured to execute the instructions of FIG. 5 to implement the example adjustment factor analyzer of FIG. 3.

FIG. 7 is a block diagram of an example processor platform 700 structured to execute the instructions of FIG. 5 to implement the adjustment factor analyzer 134 of FIG. 3. The processor platform 700 can be, for example, a server, a personal computer, a workstation, a self-learning machine (e.g., a neural network), or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example input interface 308, the example adjustment factor generator 310, the example audience summary generator 312, and the example impressions summary generator 314.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

Figure 8:
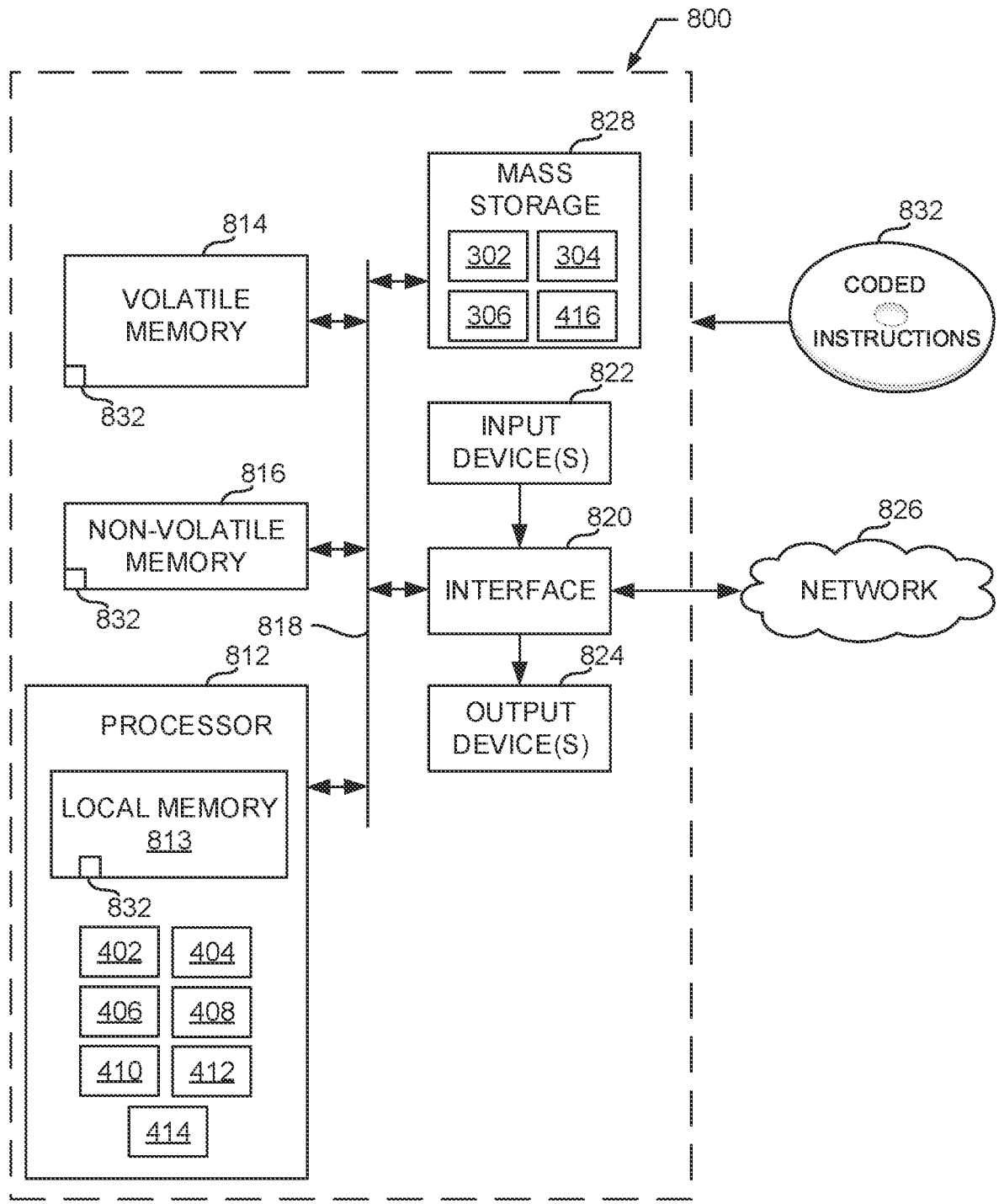
FIG. 8 is a block diagram of an example processing platform structured to execute the instructions of FIG. 6 to implement the example factor imputation controller of FIG. 4.

FIG. 8 is a block diagram of an example processor platform 800 structured to execute the instructions of FIGS. 5 and/or 6 to implement the factor imputation controller 151 of FIG. 4. The processor platform 800 can be, for example, a server, a personal computer, a workstation, a self-learning machine (e.g., a neural network), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example data input interface 402, the example grouping controller 404, the example demographic selector 406, the example distance calculator 408, the example weighting controller 410, the example imputation factor generator 412, and the example update controller 414.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5 and/or 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable the generation of accurate and reliable audience measurement metrics for Internet-based media without the use of third-party cookies and/or tags that have been the standard approach for monitoring Internet media for many years. This is accomplished by merging AME panel data with database proprietor impressions data within a privacy-protected cloud based environment. The nature of the cloud environment and the privacy constraints imposed thereon as well as the nature in which the database proprietor collects the database proprietor impression data present technological challenges contributing to limitations in the reliability and/or completeness of the data. More particularly, misattribution and/or non-coverage of impressions logged by the database proprietor can reduce the reliability of audience measurement metrics generated based on the logged impressions. Concerns for misattribution and/or non-coverage can be mitigated against by generating misattribution and/or non-coverage adjustment factors that may be applied to the data collected by the database proprietor to correct for such errors. However, such adjustment factors are only reliable when based on accurate data with sufficient sample sizes. Achieving sufficiently large sample sizes of data to generate statistically reliable adjustment factors is limited based on, for example, the technologically imposed limitations on the extraction of data from the privacy-protected cloud environment. As a result, there is likely to be circumstances where data for a given demographic is missing and/or incomplete because such data corresponds to a group of individuals that is too small to be aggregated in accordance with the privacy constraints imposed by the privacy-protected cloud environment. Examples overcome this technical problem that specifically arises in the privacy-protected cloud environment by generated imputation factors from donor adjustment factor sets (in which the data is complete and reliable) that are used to adjust or correct the adjustment factors in a recipient adjustment factor set (in which the data is missing and/or otherwise incomplete). In some examples, the imputation factors are generated when one or more additional sample size criteria (e.g., a number of unique panelists and/or a number of impressions) of data in the privacy-protected cloud environment are not satisfied. Once the adjustment factors have been corrected in this manner, examples disclosed herein apply the corrected (e.g., imputed) adjustment factors to the database proprietor impressions data to reduce error caused by misattribution and/or non-coverage of impressions, thus improving reliability of the audience measurement metrics.

Example 1 includes an apparatus including a data input interface to access different sets of initial adjustment factors, the initial adjustment factors generated to correct at least one of misattribution or non-coverage of media impressions logged by a database proprietor, a grouping controller to identify a first set of the initial adjustment factors as a set of donor adjustment factors based on (a) first audience members associated with the set of donor adjustment factors satisfying a first threshold and (b) first impressions associated with the first audience members satisfying a second threshold, and identify a second set of the initial adjustment factors as a set of recipient adjustment factors based on at least one of (a) second audience members associated with the set of recipient adjustment factors not satisfying the first threshold or (b) second impressions associated with the second audience members not satisfying the second threshold, and an imputation factor generator to generate imputation factors to correct ones of the recipient adjustment factors based on ones of the donor adjustment factors.

Example 2 includes the apparatus of Example 1, where the set of the donor adjustment factors is associated with a first geographic region and the set of the recipient adjustment factors is associated with a second geographic region different than the first geographic region.

Example 3 includes the apparatus of Example 1, further including an adjustment factor analyzer to determine the initial adjustment factors based on merged data, the merged data including panel data collected by a first server of an audience measurement entity and database proprietor impressions data collected by a second server of the database proprietor based on network communications from client devices, the merged data stored in computer memory of a privacy-protected cloud environment.

Example 4 includes the apparatus of Example 1, where the recipient adjustment factors are associated with multiple demographics, the second audience members and the second impressions corresponding to a first one of the multiple demographics.

Example 5 includes the apparatus of Example 4, further including a demographic selector to generate a first reduced set of the donor adjustment factors and a second reduced set of the recipient adjustment factors by removing the first one of the multiple demographics from the set of the donor adjustment factors and the set of the recipient adjustment factors, a distance calculator to calculate a distance between the first reduced set and the second reduced set, and a weighting controller to weight the donor adjustment factors based on the calculated distance, the imputation factor generator to generate the imputation factors based on the weighted donor adjustment factors.

Example 6 includes the apparatus of Example 5, where the set of the donor adjustment factors is a first set of the donor adjustment factors, the grouping controller to identify a second set of the donor adjustment factors, the demographic selector to generate a third reduced set of the donor adjustment factors by removing the first one of the multiple demographics from the second set of the donor adjustment factors.

Example 7 includes the apparatus of Example 6, where the distance is a first distance, the distance calculator further to calculate a second distance between the first reduced set and the third reduced set, select a lesser distance from among the first distance and the second distance, and select at least one of the first set of the donor adjustment factors or the second set of the donor adjustment factors for retention based on whether ratios of the lesser distance to respective ones of the first distance and the second distance satisfy a retention threshold, the imputation factor generator to generate the imputation factors based on the at least one of the first set of the donor adjustment factors or the second set of the donor adjustment factors selected for retention.

Example 8 includes the apparatus of Example 5, where the weighting controller is to weight ones of the recipient adjustment factors based on a recipient weight, the imputation factor generator to determine the imputation factors based on a combination of the weighted donor adjustment factors and the weighted ones of the recipient adjustment factors.

Example 9 includes the apparatus of Example 5, where the set of the recipient adjustment factors is an initial set of the recipient adjustment factors, the imputation factor generator to generate updated recipient adjustment factors by combining the imputation factors and the second reduced set, the updated recipient adjustment factors to reduce an error, relative to the initial set of the recipient adjustment factors, in correction of the at least one of the misattribution or the non-coverage of the media impressions logged by the database proprietor.

Example 10 includes an apparatus including at least one memory, instructions, and at least one processor to execute the instructions to at least access different sets of initial adjustment factors, the initial adjustment factors generated to correct at least one of misattribution or non-coverage of media impressions logged by a database proprietor, identify a first set of the initial adjustment factors as a set of donor adjustment factors based on (a) first audience members associated with the set of donor adjustment factors satisfying a first threshold and (b) first impressions associated with the first audience members satisfying a second threshold, identify a second set of the initial adjustment factors as a set of recipient adjustment factors based on at least one of (a) second audience members associated with the set of recipient adjustment factors not satisfying the first threshold or (b) second impressions associated with the second audience members not satisfying the second threshold, and generate imputation factors to correct ones of the recipient adjustment factors based on ones of the donor adjustment factors.

Example 11 includes the apparatus of Example 10, where the set of the donor adjustment factors is associated with a first geographic region and the set of the recipient adjustment factors is associated with a second geographic region different than the first geographic region.

Example 12 includes the apparatus of Example 10, where the at least one processor is to execute the instructions to determine the initial adjustment factors based on merged data, the merged data including panel data collected by a first server of an audience measurement entity and database proprietor impressions data collected by a second server of the database proprietor based on network communications from client devices, the merged data stored in computer memory of a privacy-protected cloud environment.

Example 13 includes the apparatus of Example 10, where the recipient adjustment factors are associated with multiple demographics, the second audience members and the second impressions corresponding to a first one of the multiple demographics.

Example 14 includes the apparatus of Example 13, where the at least one processor is to execute the instructions to generate a first reduced set of the donor adjustment factors and a second reduced set of the recipient adjustment factors by removing the first one of the multiple demographics from the set of the donor adjustment factors and the set of the recipient adjustment factors, calculate a distance between the first reduced set and the second reduced set, weight the donor adjustment factors based on the calculated distance, and generate the imputation factors based on the weighted donor adjustment factors.

Example 15 includes the apparatus of Example 14, where the set of the donor adjustment factors is a first set of the donor adjustment factors, the at least one processor is to execute the instructions to identify a second set of the donor adjustment factors, and generate a third reduced set of the donor adjustment factors by removing the first one of the multiple demographics from the second set of the donor adjustment factors.

Example 16 includes the apparatus of Example 15, where the distance is a first distance, the at least one processor is to execute the instructions to calculate a second distance between the first reduced set and the third reduced set, select a lesser distance from among the first distance and the second distance, select at least one of the first set of the donor adjustment factors or the second set of the donor adjustment factors for retention based on whether ratios of the lesser distance to respective ones of the first distance and the second distance satisfy a retention threshold, and generate the imputation factors based on the at least one of the first set of the donor adjustment factors or the second set of the donor adjustment factors selected for retention.

Example 17 includes the apparatus of Example 14, where the at least one processor is to execute the instructions to weight ones of the recipient adjustment factors based on a recipient weight, and generate the imputation factors based on a combination of the weighted donor adjustment factors and the weighted ones of the recipient adjustment factors.

Example 18 includes the apparatus of Example 14, where the set of the recipient adjustment factors is an initial set of the recipient adjustment factors, the at least one processor is to execute the instructions to generate updated recipient adjustment factors by combining the imputation factors and the second reduced set, the updated recipient adjustment factors to reduce an error, relative to the initial set of the recipient adjustment factors, in correction of the at least one of the misattribution or the non-coverage of the media impressions logged by the database proprietor.

Example 19 includes a non-transitory computer readable medium comprising instructions that, when executed, cause at least one processor to at least access different sets of initial adjustment factors, the initial adjustment factors generated to correct at least one of misattribution or non-coverage of media impressions logged by a database proprietor, identify a first set of the initial adjustment factors as a set of donor adjustment factors based on (a) first audience members associated with the set of donor adjustment factors satisfying a first threshold and (b) first impressions associated with the first audience members satisfying a second threshold, identify a second set of the initial adjustment factors as a set of recipient adjustment factors based on at least one of (a) second audience members associated with the set of recipient adjustment factors not satisfying the first threshold or (b) second impressions associated with the second audience members not satisfying the second threshold, and generate imputation factors to correct ones of the recipient adjustment factors based on ones of the donor adjustment factors.

Example 20 includes the non-transitory computer readable medium of Example 19, where the set of the donor adjustment factors is associated with a first geographic region and the set of the recipient adjustment factors is associated with a second geographic region different than the first geographic region.

Example 21 includes the non-transitory computer readable medium of Example 19, where the instructions, when executed, cause the at least one processor to determine the initial adjustment factors based on merged data, the merged data including panel data collected by a first server of an audience measurement entity and database proprietor impressions data collected by a second server of the database proprietor based on network communications from client devices, the merged data stored in computer memory of a privacy-protected cloud environment.

Example 22 includes the non-transitory computer readable medium of Example 19, where the recipient adjustment factors are associated with multiple demographics, the second audience members and the second impressions corresponding to a first one of the multiple demographics.

Example 23 includes the non-transitory computer readable medium of Example 22, where the instructions, when executed, cause the at least one processor to generate a first reduced set of the donor adjustment factors and a second reduced set of the recipient adjustment factors by removing the first one of the multiple demographics from the set of the donor adjustment factors and the set of the recipient adjustment factors, calculate a distance between the first reduced set and the second reduced set, weight the donor adjustment factors based on the calculated distance, and generate the imputation factors based on the weighted donor adjustment factors.

Example 24 includes the non-transitory computer readable medium of Example 23, where the set of the donor adjustment factors is a first set of the donor adjustment factors, the instructions, when executed, cause the at least one processor to identify a second set of the donor adjustment factors, and generate a third reduced set of the donor adjustment factors by removing the first one of the multiple demographics from the second set of the donor adjustment factors.

Example 25 includes the non-transitory computer readable medium of Example 24, where the distance is a first distance, the instructions, when executed, cause the at least one processor to calculate a second distance between the first reduced set and the third reduced set, select a lesser distance from among the first distance and the second distance, select at least one of the first set of the donor adjustment factors or the second set of the donor adjustment factors for retention based on whether ratios of the lesser distance to respective ones of the first distance and the second distance satisfy a retention threshold, and generate the imputation factors based on the at least one of the first set of the donor adjustment factors or the second set of the donor adjustment factors selected for retention.

Example 26 includes the non-transitory computer readable medium of Example 23, where the instructions, when executed, cause the at least one processor to weight ones of the recipient adjustment factors based on a recipient weight, and generate the imputation factors based on a combination of the weighted donor adjustment factors and the weighted ones of the recipient adjustment factors.

Example 27 includes the non-transitory computer readable medium of Example 23, where the set of the recipient adjustment factors is an initial set of the recipient adjustment factors, the instructions, when executed, cause the at least one processor to generate updated recipient adjustment factors by combining the imputation factors and the second reduced set, the updated recipient adjustment factors to reduce an error, relative to the initial set of the recipient adjustment factors, in correction of the at least one of the misattribution or the non-coverage of the media impressions logged by the database proprietor.

Examples 28 includes a method including accessing different sets of initial adjustment factors, the initial adjustment factors generated to correct at least one of misattribution or non-coverage of media impressions logged by a database proprietor, identifying a first set of the initial adjustment factors as a set of donor adjustment factors based on (a) first audience members associated with the set of donor adjustment factors satisfying a first threshold and (b) first impressions associated with the first audience members satisfying a second threshold, identifying a second set of the initial adjustment factors as a set of recipient adjustment factors based on at least one of (a) second audience members associated with the set of recipient adjustment factors not satisfying the first threshold or (b) second impressions associated with the second audience members not satisfying the second threshold, and generating imputation factors to correct ones of the recipient adjustment factors based on ones of the donor adjustment factors.

Example 29 includes the method of Example 28, where the set of the donor adjustment factors is associated with a first geographic region and the set of the recipient adjustment factors is associated with a second geographic region different than the first geographic region.

Example 30 includes the method of Example 28, further including determining the initial adjustment factors based on merged data, the merged data including panel data collected by a first server of an audience measurement entity and database proprietor impressions data collected by a second server of the database proprietor based on network communications from client devices, the merged data stored in computer memory of a privacy-protected cloud environment.

Example 31 includes the method of Example 28, where the recipient adjustment factors are associated with multiple demographics, the second audience members and the second impressions corresponding to a first one of the multiple demographics.

Example 32 includes the method of Example 31, further including generating a first reduced set of the donor adjustment factors and a second reduced set of the recipient adjustment factors by removing the first one of the multiple demographics from the set of the donor adjustment factors and the set of the recipient adjustment factors, calculating a distance between the first reduced set and the second reduced set, weighting the donor adjustment factors based on the calculated distance, and generating the imputation factors based on the weighted donor adjustment factors.

Example 33 includes the method of Example 32, further including identifying a second set of the donor adjustment factors, and generate a third reduced set of the donor adjustment factors by removing the first one of the multiple demographics from the second set of the donor adjustment factors.

Example 34 includes the method of Example 33, where the distance is a first distance, further including calculating a second distance between the first reduced set and the third reduced set, selecting a lesser distance from among the first distance and the second distance, selecting at least one of the first set of the donor adjustment factors or the second set of the donor adjustment factors for retention based on whether ratios of the lesser distance to respective ones of the first distance and the second distance satisfy a retention threshold, and generating the imputation factors based on the at least one of the first set of the donor adjustment factors or the second set of the donor adjustment factors selected for retention.

Example 35 includes the method of Example 32, further including weighting ones of the recipient adjustment factors based on a recipient weight, and generating the imputation factors based on a combination of the weighted donor adjustment factors and the weighted ones of the recipient adjustment factors.

Example 36 includes the method of Example 32, where the set of the recipient adjustment factors is an initial set of the recipient adjustment factors, further including generating updated recipient adjustment factors by combining the imputation factors and the second reduced set, the updated recipient adjustment factors to reduce an error, relative to the initial set of the recipient adjustment factors, in correction of the at least one of the misattribution or the non-coverage of the media impressions logged by the database proprietor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
a processor; and
memory storing instructions that, upon execution by the processor, cause the processor to perform operations comprising:
identifying donor adjustment factors and recipient adjustment factors used for correction of at least one of misattribution or non-coverage of media impressions logged by a database proprietor, the donor adjustment factors including first donor adjustment factors associated with a first geographic region and second donor adjustment factors associated with a second geographic region different from the first geographic region, the recipient adjustment factors associated with a third geographic region different from the first and second geographic regions;
determining a first reduced donor factor set corresponding to ones of the first donor adjustment factors that satisfy a threshold;
determining a second reduced donor factor set corresponding to ones of the second donor adjustment factors that satisfy the threshold; and
generating imputation factors based on an aggregation of retained ones of the donor adjustment factors, the retained ones of the donor adjustment factors selected based on the first reduced donor factor set and the second reduced donor factor set, the imputation factors to reduce error in the correction.

2. The system of claim 1, wherein the threshold is associated with at least one of an audience count or an impressions count.

3. The system of claim 1, the operations further comprising determining a reduced recipient factor set corresponding to ones of the recipient adjustment factors that satisfy the threshold.

4. The system of claim 3, the operations further comprising:
calculating a first distance between the reduced recipient factor set and the first reduced donor factor set; and
calculating a second distance between the reduced recipient factor set and the second reduced donor factor set.

5. The system of claim 4, the operations further comprising:
selecting a lesser distance from the first distance and the second distance;
determining a first ratio of the lesser distance to the first distance and a second ratio of the lesser distance to the second distance; and
selecting the retained ones of the donor adjustment factors based on the first and second ratios, the retained ones of the donor adjustment factors to include the first donor adjustment factors in response to the first ratio satisfying a retention threshold, the retained ones of the donor adjustment factors to include the second donor adjustment factors in response to the second ratio satisfying the retention threshold.

6. The system of claim 4, the operations further comprising:
weighting the first donor adjustment factors by a reciprocal of the first distance;
weighting the second donor adjustment factors by a reciprocal of the second distance.

7. The system of claim 1, the operations further comprising:
   weighting the recipient adjustment factors based on a recipient weight; and
   generating the imputation factors based on a combination of the weighted recipient adjustment factors and the aggregation of the retained ones of the donor adjustment factors.

8. A non-transitory computer readable medium comprising instructions that, when executed, cause a processor to at least:
   identify donor adjustment factors and recipient adjustment factors used for correction of at least one of misattribution or non-coverage of media impressions logged by a database proprietor, the donor adjustment factors including first donor adjustment factors associated with a first geographic region and second donor adjustment factors associated with a second geographic region different from the first geographic region, the recipient adjustment factors associated with a third geographic region different from the first and second geographic regions;
   determine a first reduced donor factor set corresponding to ones of the first donor adjustment factors that satisfy a threshold;
   determine a second reduced donor factor set corresponding to ones of the second donor adjustment factors that satisfy the threshold; and
   generate imputation factors based on an aggregation of retained ones of the donor adjustment factors, the retained ones of the donor adjustment factors selected based on the first reduced donor factor set and the second reduced donor factor set, the imputation factors to reduce error in the correction.

9. The non-transitory computer readable medium of claim 8, wherein the threshold is associated with at least one of an audience count or an impressions count.

10. The non-transitory computer readable medium of claim 8, wherein the instructions, when executed, cause the processor to determine a reduced recipient factor set corresponding to ones of the recipient adjustment factors that satisfy the threshold.

11. The non-transitory computer readable medium of claim 10, wherein the instructions, when executed, cause the processor to:
   calculate a first distance between the reduced recipient factor set and the first reduced donor factor set; and
   calculate a second distance between the reduced recipient factor set and the second reduced donor factor set.

12. The non-transitory computer readable medium of claim 11, wherein the instructions, when executed, cause the processor to:
   select a lesser distance from the first distance and the second distance;
   determine a first ratio of the lesser distance to the first distance and a second ratio of the lesser distance to the second distance; and
   select the retained ones of the donor adjustment factors based on the first and second ratios, the retained ones of the donor adjustment factors to include the first donor adjustment factors in response to the first ratio satisfying a retention threshold, the retained ones of the donor adjustment factors to include the second donor adjustment factors in response to the second ratio satisfying the retention threshold.

13. The non-transitory computer readable medium of claim 11, wherein the instructions, when executed, cause the processor to:
   weight the first donor adjustment factors by a reciprocal of the first distance; and
   weight the second donor adjustment factors by a reciprocal of the second distance.

14. The non-transitory computer readable medium of claim 8, wherein the instructions, when executed, cause the processor to:
   weight the recipient adjustment factors based on a recipient weight; and
   generate the imputation factors based on a combination of the weighted recipient adjustment factors and the aggregation of the retained ones of the donor adjustment factors.

15. A method comprising:
   identifying donor adjustment factors and recipient adjustment factors used for correction of at least one of misattribution or non-coverage of media impressions logged by a database proprietor, the donor adjustment factors including first donor adjustment factors associated with a first geographic region and second donor adjustment factors associated with a second geographic region different from the first geographic region, the recipient adjustment factors associated with a third geographic region different from the first and second geographic regions;
   determining a first reduced donor factor set corresponding to ones of the first donor adjustment factors that satisfy a threshold;
   determining a second reduced donor factor set corresponding to ones of the second donor adjustment factors that satisfy the threshold; and
   generating, by executing instructions with a processor, imputation factors based on an aggregation of retained ones of the donor adjustment factors, the retained ones of the donor adjustment factors selected based on the first reduced donor factor set and the second reduced donor factor set, the imputation factors to reduce error in the correction.

16. The method of claim 15, wherein the threshold is associated with at least one of an audience count or an impressions count.

17. The method of claim 15, further including determining a reduced recipient factor set corresponding to ones of the recipient adjustment factors that satisfy the threshold.

18. The method of claim 17, further including:
   calculating a first distance between the reduced recipient factor set and the first reduced donor factor set; and
   calculating a second distance between the reduced recipient factor set and the second reduced donor factor set.

19. The method of claim 18, further including:
   selecting a lesser distance from the first distance and the second distance;
   determining a first ratio of the lesser distance to the first distance and a second ratio of the lesser distance to the second distance; and
   selecting the retained ones of the donor adjustment factors based on the first and second ratios, the retained ones of the donor adjustment factors to include the first donor adjustment factors in response to the first ratio satisfying a retention threshold, the retained ones of the donor adjustment factors to include the second donor adjustment factors in response to the second ratio satisfying the retention threshold.

20. The method of claim 18, further including:
weighting the first donor adjustment factors by a reciprocal of the first distance; and
weighting the second donor adjustment factors by a reciprocal of the second distance.

\* \* \* \* \*